(12) United States Patent
Hinata

(10) Patent No.: US 9,007,309 B2
(45) Date of Patent: Apr. 14, 2015

(54) INPUT DEVICE, AND ELECTRO-OPTICAL DEVICE

(75) Inventor: Shoji Hinata, Matsumoto (JP)

(73) Assignee: Japan Display Inc., Tokyo (JP)

( * ) Notice: Subject to any disclaimer, the term of this patent is extended or adjusted under 35 U.S.C. 154(b) by 1536 days.

(21) Appl. No.: 12/044,585

(22) Filed: Mar. 7, 2008

(65) Prior Publication Data

US 2008/0246741 A1    Oct. 9, 2008

(30) Foreign Application Priority Data

Apr. 5, 2007    (JP) .................. 2007-099088
Apr. 5, 2007    (JP) .................. 2007-099089
Oct. 15, 2007   (JP) .................. 2007-267467

(51) Int. Cl.
*G06F 3/041*    (2006.01)
*G06F 3/045*    (2006.01)
*G06F 1/16*     (2006.01)

(52) U.S. Cl.
CPC .............. *G06F 3/045* (2013.01); *G06F 1/1643* (2013.01); *G06F 2200/1634* (2013.01)

(58) Field of Classification Search
None
See application file for complete search history.

(56) References Cited

U.S. PATENT DOCUMENTS

| | | | |
|---|---|---|---|
| 6,573,886 B1 * | 6/2003 | Lehtinen et al. | 345/173 |
| 6,765,637 B2 * | 7/2004 | Takenaka | 349/113 |
| 2008/0007538 A1 | 1/2008 | Kotera et al. | |

FOREIGN PATENT DOCUMENTS

| | | |
|---|---|---|
| JP | 2000-249596 | 9/2000 |
| JP | 2003-043450 | 2/2003 |
| JP | 2004-151961 | 5/2004 |
| JP | 2006-236296 | 9/2006 |
| JP | 2007-316847 | 12/2007 |
| KR | 2001-0034828 | 4/2001 |
| WO | 2004-019119 | 3/2004 |

OTHER PUBLICATIONS

Taiwanese Office Action issued Oct. 15, 2013 in a corresponding Taiwanese Patent Application.

* cited by examiner

*Primary Examiner* — Jason Olson
(74) *Attorney, Agent, or Firm* — K&L Gates LLP

(57) ABSTRACT

An input device includes an input panel, a cover member that is provided with a housing portion, in which the input panel is housed, and a film member that is disposed over a main surface of the input panel provided in the housing portion and a main surface of the cover member.

16 Claims, 19 Drawing Sheets

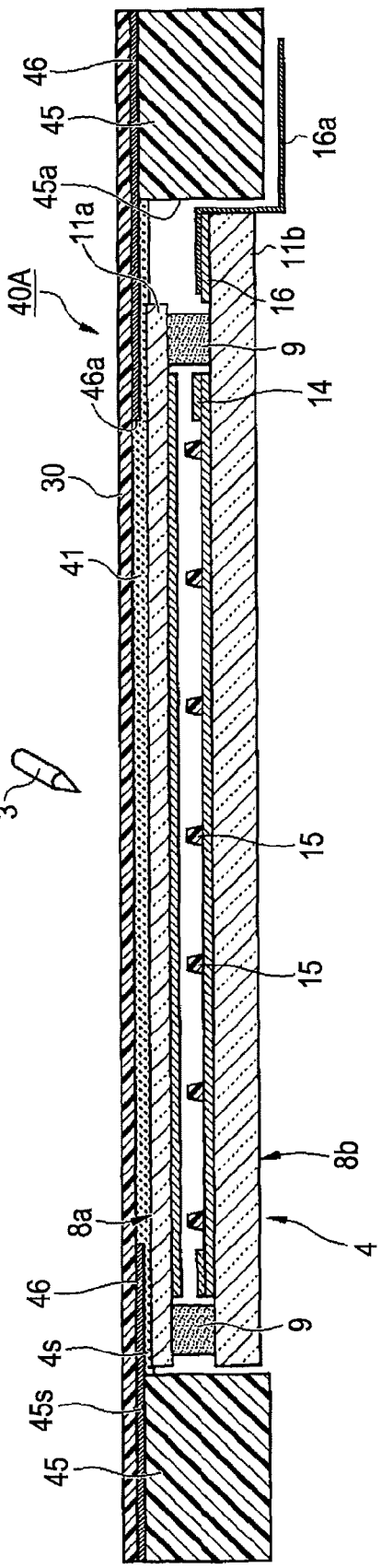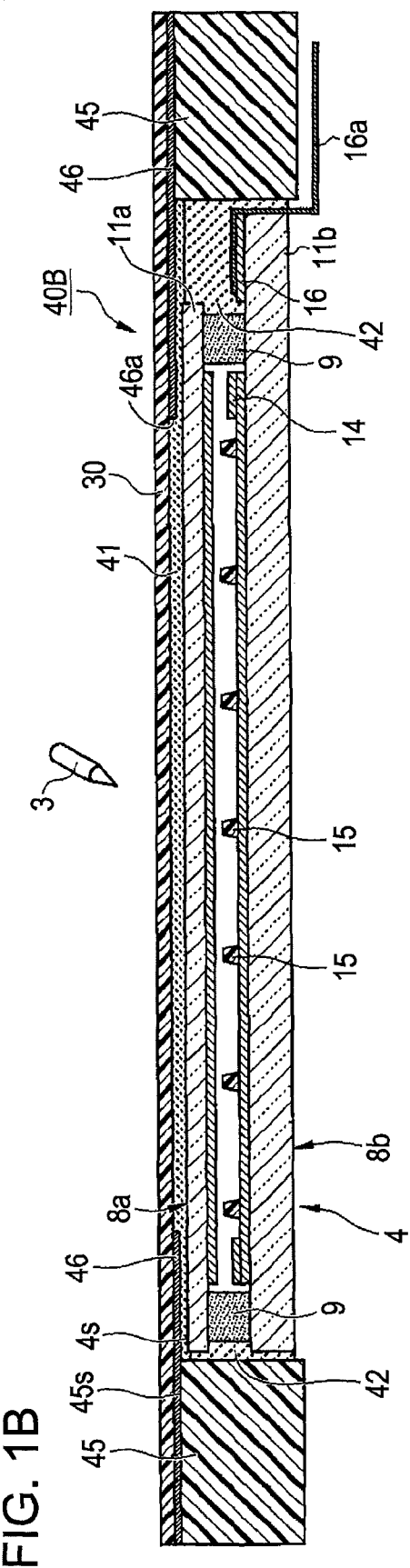

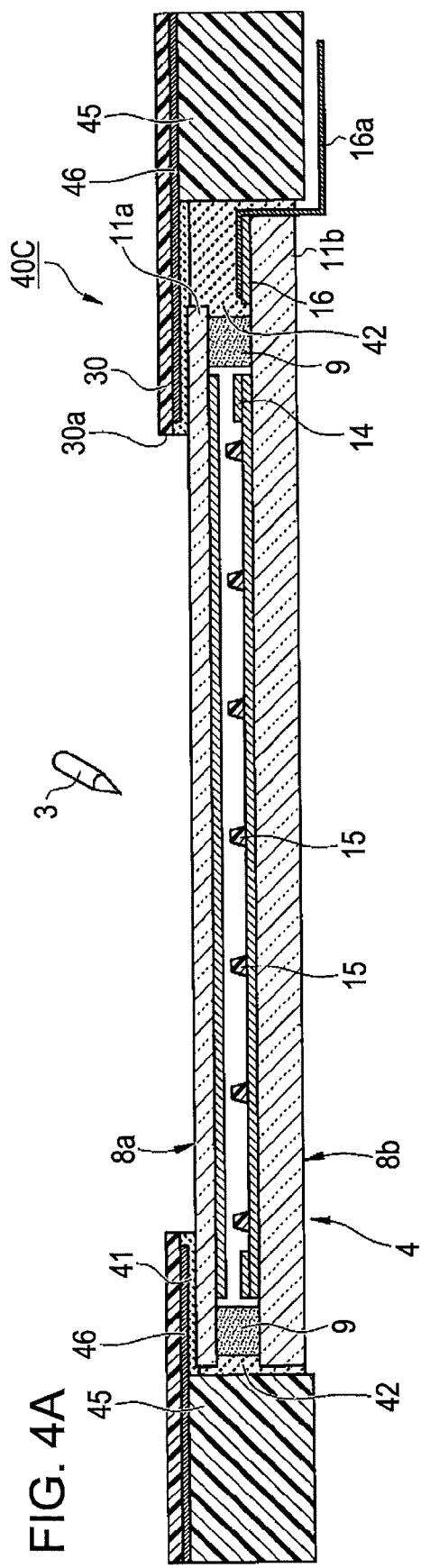
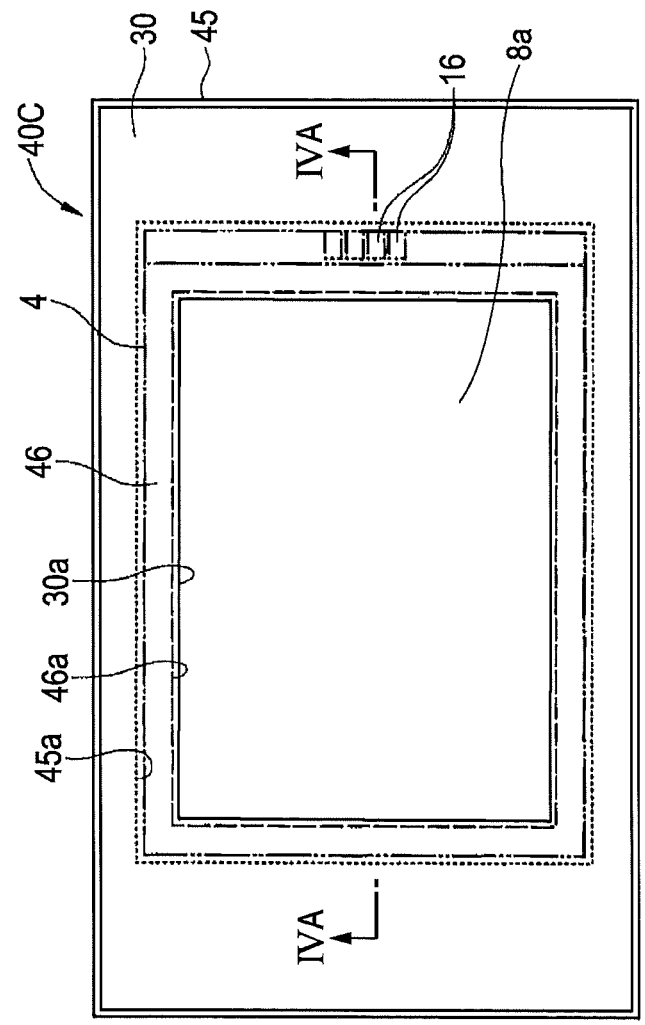
FIG. 4A
FIG. 4B

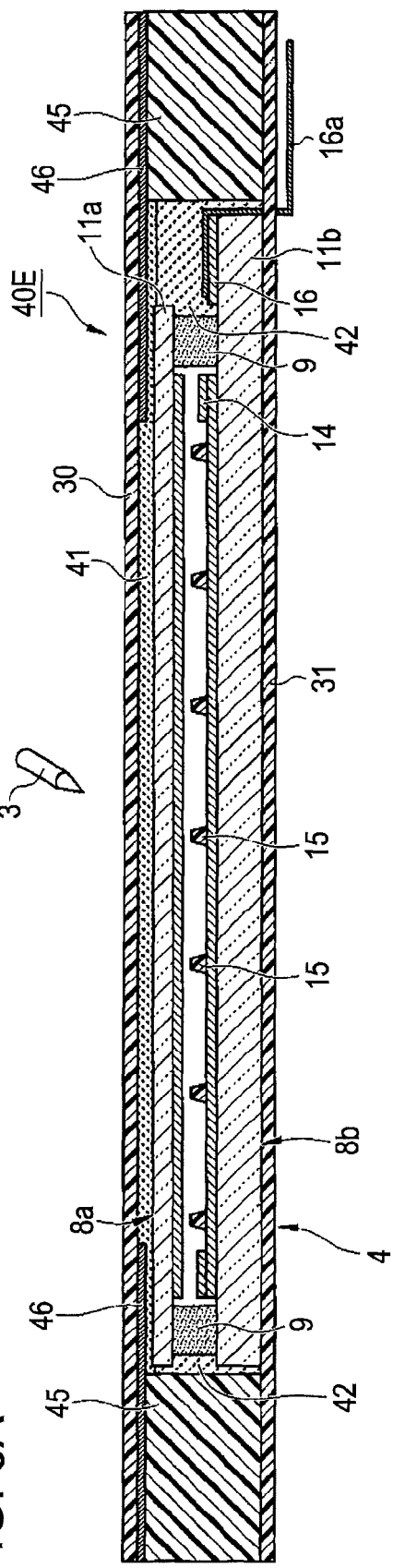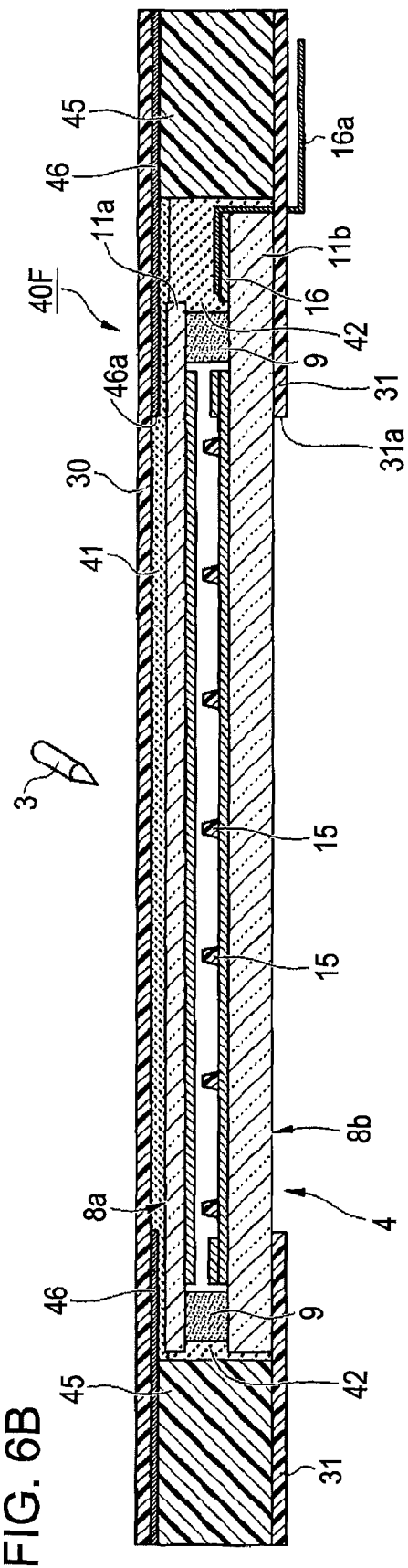

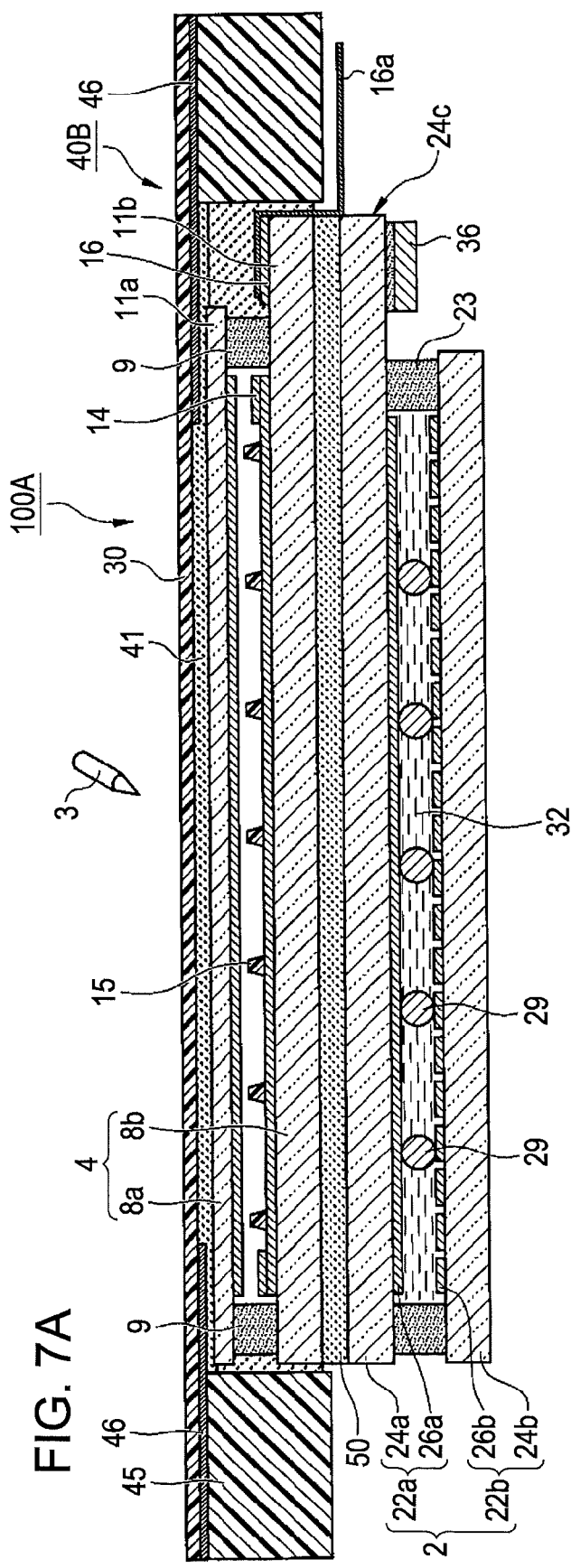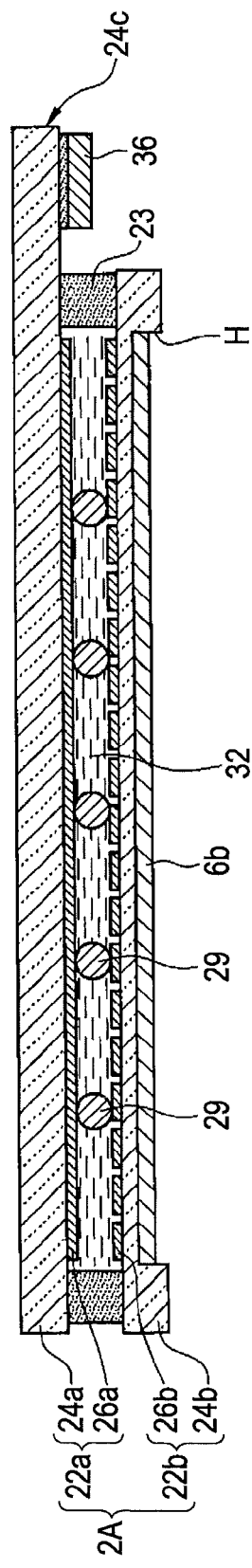

INPUT DEVICE, AND ELECTRO-OPTICAL DEVICE

The entire disclosure of Japanese Patent Application Nos. 2007-099088, filed Apr. 5, 2007, 2007-267467, filed Oct. 15, 2007 and 2007-088089, filed Apr. 5, 2007 are expressly incorporated by reference herein.

BACKGROUND

1. Technical Field

The present invention relates to an input device, an electro-optical device, and an electronic apparatus.

2. Related Art

In recent years, with the spread of small information electronic apparatuses, such as personal digital assistants (PDAs), palmtop computers, or the like, liquid crystal devices that have a touch panel, which is mounted on a liquid crystal panel, as input devices have been widely used (for example, JP-A-2003-43450).

When a liquid crystal device having a touch panel is used as a display unit of an electronic apparatus, the touch panel needs to be exposed at a surface of a casing. Accordingly, a frame portion of the touch panel is usually pressed and supported by the casing. In such a structure, a step is formed between the casing and an operating surface of the touch panel (see FIG. 21). As a result, the casing and the touch panel may not be integrally designed, which may cause reduction of the degree of freedom in design.

SUMMARY

An advantage of some aspects of the invention is that it provides an input device capable of improving a design property and improving reliability of an electronic apparatus having an input unit, and an electro-optical device.

According to an aspect of the invention, an input device includes an input panel, a cover member that is provided with a housing portion, in which the input panel is housed, and a flexible (film) member that is adhered over a main surface of the input panel provided in the housing portion and a main surface of the cover member.

According to this configuration, the flexible member is adhered over the input panel and the cover member in a state where the input panel is housed in the housing portion of the cover member, a step at the boundary between the input panel and the cover member that deteriorated the design property can be eliminated. Therefore, an input device having an excellent design property can be implemented.

In addition, the flexible member is disposed on the main surface side of the input panel. Therefore, when the input panel has a glass substrate, even if glass is broken, broken pieces can be prevented from shattering.

As the step is eliminated, dust can be prevented from being collected at the step, or water droplets can be prevented from entering through the boundary of the input panel and the cover member. As a result, a high-reliable input device can be implemented.

A second flexible member may be adhered on an opposite side of the input panel to the flexible member.

With this configuration, the movement of the input panel in its thickness direction is suppressed by the second flexible member. Therefore, during an input operation on the input panel, the input panel can be prevented from being pressed down to the rear side by a pressing force of an input tool or a finger.

The flexible member may be a film member. If the flexible member is a thin film member, an operation pressure on the input panel can be prevented from being increased. In addition, when display is performed on the liquid crystal panel through the input panel, high transmittance can be obtained and high-quality display can be realized. Furthermore, if the second flexible member is also a film member, the entire input device can be prevented from being thickened. Therefore, the input device that can implement a thin electronic apparatus can be obtained.

A light-shielding film may be formed on a surface of the film member facing the input panel.

If the light-shielding film is formed on the film member, a blinder for an unnecessary portion can be easily formed. In addition, alignment of the light-shielding film can be easily made. Furthermore, the design property can be improved.

The film member and the input panel may be optically adhered to each other.

With this configuration, when display is performed through the input panel, unnecessary reflection at an interface of an air layer located between the input panel and the film member can be prevented from occurring. In addition, display quality can be prevented from deteriorating and bright display can be realized.

The film member may have an opening within a planar region of the input panel. If the opening is provided in the film member, an operating surface of input panel can be exposed, and the operation pressure can be reduced, which enables a comfort input operation. According to the aspect of the invention, since a thin member is adhered to the input panel and the cover member, there is no case where a large step is formed in the opening of the film member. Therefore, operationality can be improved without sacrificing the design property.

An adhesive may be provided between the input panel and an inner wall of the housing portion.

With this configuration, since the cover member and the input panel are adhered to each other, the input panel can be stably supported. In addition, during the input operation, the input panel can be reliably prevented from being pressed down.

The flexible member that is adhered to the main surface of the input panel may be a polarizing plate.

With this configuration, some of optical elements in a display unit, such as a liquid crystal panel, which are disposed on a rear surface of the input panel, can be disposed on a front surface of the input device.

In addition to the polarizing plate, other optical elements may be disposed on the front surface of the input panel. For example, an optical element, which is a laminate of a polarizing plate and a retardation film, may be disposed, or an antireflection film or a light-diffusing film may be disposed.

The housing portion may be an opening that is formed to pass through the cover member.

With this configuration, a processing for forming the housing portion can be facilitated, and the input device can be manufactured at low cost. According to the aspect of the invention, the input panel disposed in the housing portion is supported by the flexible member that is adhered over the main surface of the cover member and the main surface of the input panel. Therefore, the housing portion itself does not need to have a function of holding the input panel. In addition, an affect by a variation in dimension (particularly, size) of the input panel can be excluded.

According to another aspect of the invention, an electro-optical device includes an input device, the input device including an input panel, a cover member that is provided with a housing portion, in which the input panel is housed, and a flexible member that is adhered over a main surface of the input panel provided in the housing portion and a main surface of the cover member, and an electro-optical panel that is provided on a side of the input device opposite to the flexible member.

With this configuration, it is possible to provide an electro-optical device that has an excellent design property by the input device according to the aspect of the invention, and can perform an input operation and image display through the input panel.

As the electro-optical panel, various display devices, such as a liquid crystal panel, an organic EL panel, and an electrophoretic display panel, may be used. Alternatively, a plasma display device or a field emission display (FED) may be used.

A substrate constituting the electro-optical panel and a surface of the input device opposite to the flexible member may be optically adhered to each other.

With this configuration, display light emitted from the electro-optical panel can be prevented from being reflected from a substrate surface of the input panel constituting the input device. Therefore, bright display can be realized.

The electro-optical panel may be fixed to the cover member, and the input panel may be clamped between the electro-optical panel and the flexible member.

In this way, if the input panel is clamped by the electro-optical panel and the flexible member, the movement of the input panel in its thickness direction can be suppressed. Therefore, during the input operation on the input panel, the input panel can be prevented from being pressed down toward the electro-optical panel.

The flexible member may be a polarizing plate. With this configuration, the polarizing plate that is disposed between the electro-optical panel and the input device is disposed outside the input panel. Therefore, a space on the rear surface of the input panel can be saved. As a result, it is possible to provide an electro-optical device that can be easily mounted on a small electronic apparatus.

A translucent elastic member may be disposed between the substrate constituting the electro-optical panel and the surface of the input device opposite to the flexible member.

According to still another aspect of the invention, an input device includes an input panel, a cover member that is provided with a housing portion, in which the input panel is housed, and a film member that is adhered over a main surface of the input panel in the housing portion and a main surface of the cover member, and comes into close contact with the input panel and the cover member along a step formed at a boundary of the main surface of the input panel and the main surface of the cover member.

With this configuration, the film member is deformed and adhered to follow the step formed at the boundary of the main surface of the input panel and the main surface of the cover member. Accordingly, on the surface of the film member, the step can be tempered and have a smoothly continuous shape. Therefore, the design property can be prevented from deteriorating due to the step. As a result, an input device having an excellent design property can be implemented.

In addition, the film member is disposed on the main surface side of the input panel. Accordingly, when the input panel has a glass substrate, even if glass is broken, broken pieces can be prevented from shattering.

Furthermore, the film member is adhered to cover the step at the boundary. Therefore, dust can be prevented from being collected at the step, and water droplets can be prevented from entering through the boundary of the input panel and the cover member. As a result, a high-reliable input device can be implemented.

A rear-side film member may be adhered to a rear surface opposite to the main surface of the cover member, to thereby clamp the input panel together with the film member.

With this configuration, the movement of the input panel in its thickness direction can be suppressed by the rear-side film member. Therefore, during the input operation on the input panel, the input panel can be prevented from being pressed down to the rear side by a pressing force of an input tool or a finger.

The film member may have an opening within a planar region of the main surface of the input panel.

In this way, if the opening is provided in the film member, an operating surface of the input panel can be exposed, an operation pressure can be reduced, which enables a comfort input operation. According to the aspect of the invention, since the film member is adhered to the input panel and the cover member, there is no case where a large step is formed in the opening of the film member. Therefore, operationality can be improved without sacrificing the design property.

The film member may be a laminate of a first resin layer and a second resin layer that is formed of a resin material having a hardness lower than that of the first resin layer. With this configuration, the second resin layer having high flexibility is provided. Therefore, the film member can be flexibly deformed at the boundary of the input panel and the cover member, such that the film member can favorably come into close contact with the input panel and the cover member.

The second resin layer may have an opening within a planar region of the input panel. With this configuration, since a harder first resin layer is disposed on the input panel, abrasion or damage by the input operation can be favorably prevented.

A panel support may be formed in the housing portion of the cover member to be in contact with the input panel and support the input panel. With this configuration, the movement of the input panel in its thickness direction can be suppressed by the panel support. Therefore, the input panel can be easily aligned with the cover member, and the film member can be easily adhered.

The panel support may be formed in a frame shape to protrude from an inner wall the housing portion into the housing portion. That is, the panel support is preferably formed to press a marginal portion of the input panel. With this configuration, a peripheral partition of the input panel can be constituted by the panel support. In addition, if the panel support is provided separately from the housing portion, the height of the step at the boundary of the cover member and the input panel can be lowered.

An adhesive may be disposed between the input panel and the cover member. With this configuration, the input panel can be stably supported by the cover member. Therefore, ease of handling during a manufacturing process and reliability during the input operation can be improved.

According to yet still another aspect of the invention, there is a method of manufacturing an input device that includes an input panel and a cover member supporting the input panel. The method includes disposing the input panel in a concave portion formed in the cover member or a housing portion composed of an opening, disposing a film member over an input operation surface of the input panel and a main surface of the cover member facing the input operation surface, and heating and softening the film member to adhere the film member to the input panel and the cover member.

According to this manufacturing method, the film member can be easily adhered to the input panel and the cover member. In addition, the film member can be simply deformed to follow the boundary.

In the adhering of the film member, the film member may be adhered by a vacuum thermal-welding method. According to this manufacturing method, the film member can be easily and efficiently adhered and in close contact.

The method may include adhering a rear-side film member on a rear surface of the cover member opposite to the main surface to support the input panel from the rear surface. According to this manufacturing method, before the film member is adhered, the input panel can be fixed to the cover member. Therefore, with this manufacturing method, the film member can be accurately adhered, and yield can be improved.

The film member may be a laminate of a first resin layer and a second resin layer that is formed of a resin material having a hardness lower than that of the first resin layer, and in the disposing of the film member, the second resin layer may be disposed at the boundary of the input panel and the cover member. According to this manufacturing method, since the second resin layer having high flexibility is disposed, the film member can be easily deformed to follow the shape of the boundary.

According to yet still another aspect of the invention, an electro-optical device includes an input device, the input device including an input panel, a cover member that is provided with a housing portion, in which the input panel is housed, and a film member that is adhered over a main surface of the input panel in the housing portion and a main surface of the cover member, and comes into close contact with the input panel and the cover member along a step formed at a boundary of the main surface of the input panel and the main surface of the cover member, and an electro-optical panel that is provided on a side of the input device opposite to the film member.

With this configuration, it is possible to provide an electro-optical device that has an excellent design property by the input device according to the aspect of the invention, and can perform an input operation and image display through the input panel.

As the electro-optical panel, various display devices, such as a liquid crystal panel, an organic EL panel, and an electrophoretic display panel, may be used. Alternatively, a plasma display device or a field emission display (FED) may be used.

According to yet still another aspect of the invention, an electronic apparatus includes the above-described input device, or the above-described electro-optical device. According to this configuration, it is possible to provide an electronic apparatus that has an excellent design property.

BRIEF DESCRIPTION OF THE DRAWINGS

The invention will be described with reference to the accompanying drawings, wherein like numbers reference like elements.

FIGS. 1A and 1B are schematic cross-sectional views of input devices according to first and second examples of a first embodiment of the invention, respectively, taken along the line I-I of FIG. 2.

FIG. 4A is a schematic cross-sectional view showing an input device according to a third example of the first embodiment, taken along the line IVA-IVA of FIG. 4B, and FIG. 4B is a schematic plan view corresponding to FIG. 4A.

FIGS. 6A and 6B are diagrams showing input devices according to fifth and sixth examples of the first embodiment, respectively.

FIGS. 7A and 7B are schematic cross-sectional views showing a liquid crystal device according to a first example of a second embodiment of the invention.

DESCRIPTION OF EXEMPLARY EMBODIMENTS

Figure 2:
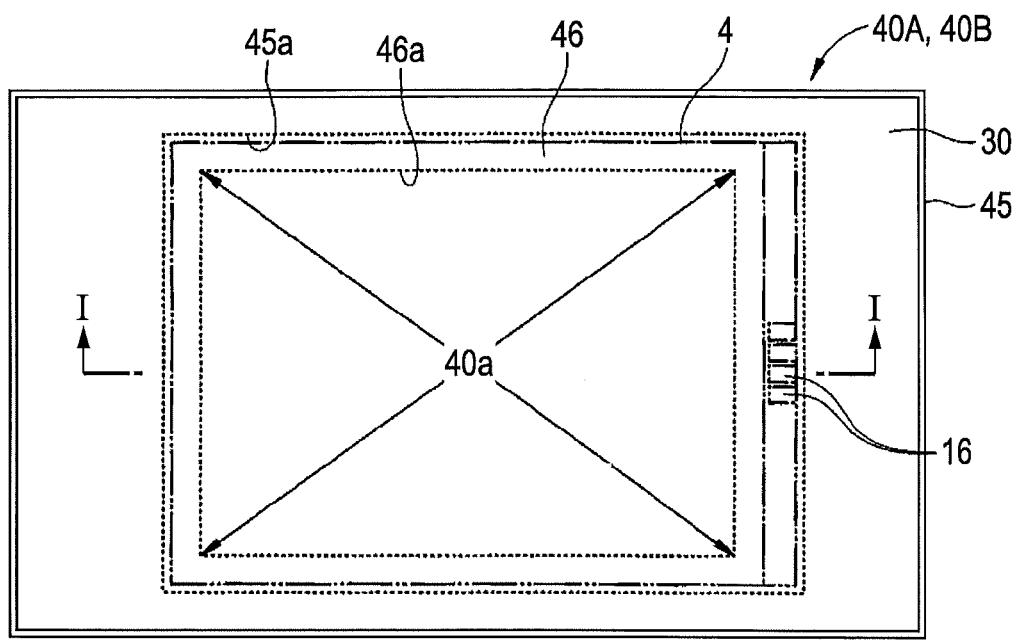
FIG. 2 is a schematic plan view corresponding to FIG. 1A.

Hereinafter, exemplary embodiments of the invention will be described with reference to the drawings. In the drawings, the thickness or the size ratio of each component has been adjusted so as to be of a recognizable size.

First Embodiment

Figure 3:
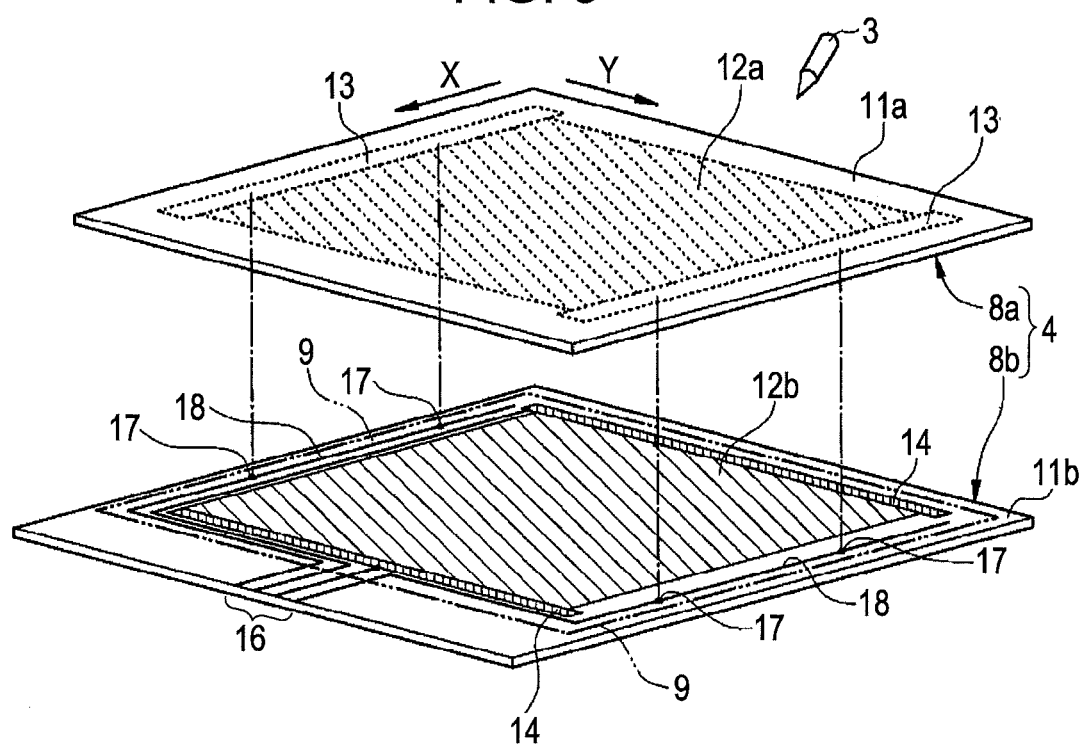
FIG. 3 is an exploded perspective view of a touch panel according to the first embodiment.

FIG. 1A is a schematic cross-sectional view of an input device 40A according to a first example of a first embodiment of the invention. FIG. 1B is a schematic cross-sectional view of an input device 40B according to a second example of the first embodiment of the invention. FIG. 2 is a schematic plan view of the input device 40A shown in FIG. 1A. FIG. 3 is an exploded perspective view showing the structure of a touch panel 4.

First Example

As shown in FIGS. 1A and 2, the input device 40A of this embodiment includes a cover member 45 that is approximately plate shaped in plan view, an analog resistive film-type touch panel (input panel) 4 that is disposed within a housing portion 45a composed of a rectangular opening formed in the cover member 45, and a film member (flexible member) 30 that is adhered over a main surface 45s (a front surface in FIG. 2) of the cover member 45 and a main surface 4s of the touch panel 4. A light-shielding film 46 is formed on the cover member 45 of the film member 30 by, for example, printing. The light-shielding film 46 has a rectangular opening 46a within a planar region corresponding to an input portion 40a of the touch panel 4. Accordingly, a planar region other than the input portion 40a of the touch panel 4 (a planar region extending from the end of the input portion 40a to the end of a substrate main body 11b) is shielded by the light-shielding film 46.

The thickness of the touch panel 4 is substantially similar to the thickness of the cover member 45, and the thickness of the touch panel 4 is set to be equal to or less than the thickness of the cover member 45. Accordingly, the touch panel 4 is housed in the housing portion 45a of the cover member 45, and the main surface 4s of the touch panel 4 and the main surface 45s of the cover member 45 are substantially aligned with each other in side sectional view. An adhesive (not shown) is provided between the main surface 45s of the cover member 45 and the film member 30 (light-shielding film 46). In addition, an adhesive 41 is provided between the main surface 4s of the touch panel 4 and a surface of the film member 30 facing the touch panel 4 to optically adhere the touch panel 4 and the film member 30 to each other. Then, the film member 30 and the cover member 45, and the touch panel 4 and the film member 30 are adhered to each other.

As a result, as shown in FIG. 1A, a surface of the film member 30 supporting the touch panel 4 and the cover member 45 becomes flat with no step. That is, no step is formed between the main surface 4s of the touch panel 4 and the main surface 45s of the cover member 45.

The touch panel 4 is formed as a single body by bonding a front substrate (first substrate) 8a and a rear substrate (second substrate) 8b, which face each other with a predetermined gap therebetween, with a sealing material 9, which is provided in the marginal portions of the two substrates 8a and 8b in a ring shape.

As shown in FIG. 3, on the front substrate 8a of the touch panel 4, a uniform planar electrode (high resistance film; first electrode) 12a formed of a transparent conductive material is formed on an inner surface of a substrate main body 11a formed of a transparent base material (a surface facing the rear substrate). In addition, a pair of low resistance films 13 are formed at both ends of the planar electrode 12a in a Y direction of FIG. 3 (two opposing sides of the rectangular planar electrode 12a). The low resistance films 13 formed on the front substrate 8a are conductively connected to auxiliary electrodes 18 formed on the rear substrate 8b through conductive members 17, and are extended to a terminal portion 16 through the auxiliary electrodes 18. The low resistance films 13 and 14 and the auxiliary electrodes 18 constitute a wiring portion of the touch panel 4, and are formed along the marginal portion of the substrate 8a or the substrate 8b.

On the rear substrate 8b of the touch panel 4, a uniform planar electrode (high resistance film; second electrode) 12b formed of a transparent conductive material is formed on an inner surface of the substrate main body 11b as a transparent base material (a surface facing the front substrate). In addition, a pair of low resistance films 14 are formed at both ends of the planar electrode 12b in an X direction (two opposing sides of the rectangular planar electrode planar electrode 12b). The terminal portion 16, to which wiring lines led from the low resistance films 13 and the low resistance films 14 are connected, is formed at an edge of the rear substrate 8b.

As shown in FIG. 1A, a flexible printed board 16a is adhered to the terminal portion 16 through an ACP (Anisotropic Conductive Paste) or an ACF (Anisotropic Conductive Film), such that the terminal portion 16 and an external control circuit are electrically connected with each other.

In this embodiment, a planar region on the outer surface of the front substrate 8a that corresponds to a region in which the planar electrode 12a is formed becomes a coordinate input surface (the input portion 40a that is an operating surface, on which a user directly indicates a position on the touch panel with an input tool 3 or his/her finger).

For the substrate main bodies 11a and 11b that constitute the front substrate 8a and the rear substrate 8b, respectively, a hard glass substrate is used. If the glass substrate is used for the front substrate 8a, the substrate or the electrode can be prevented from deteriorating, compared with a case where a plastic substrate is used for the front substrate. Meanwhile, the hard glass substrate has flexibility inferior to that of a plastic film substrate. For this reason, if an input load is small, an input may not be sufficiently performed. Therefore, in this embodiment, the glass substrate is formed thin to have a thickness of 0.1 mm to 0.2 mm, thereby resolving a problem in operationality. As the substrate main body 11b constituting the rear substrate 8b, one having the same thickness as a liquid crystal panel is used. For example, in this example, the rear substrate 8b of the touch panel 4 has a thickness of approximately 0.5 mm.

The planar electrodes 12a and 12b are formed of a transparent conductive film, such as ITO (Indium Tin Oxide), and have uniform surface resistance over their entire surfaces. In addition, the low resistance films 13 and 14, the auxiliary electrodes 18, and the terminal portion 16 are formed of a metal thin film having high conductivity, such as Au, Ag, Cu, Al, or Cr, or an alloy containing one or more metals.

In this embodiment, since the glass substrate is used as the substrate main body of the front substrate 8a or the rear substrate 8b, unlike a known touch panel that uses a plastic film substrate, a high-temperature heat treatment or an etching process using a strongly acidic etchant can be performed. For this reason, in this embodiment, the conductive films for detecting coordinate information (the planar electrodes 12a and 12b, the auxiliary electrodes 18, and the terminal portion 16) are all formed using a vacuum process, such as a sputtering method or a deposition method. In addition, the low resistance films 13 and 14 and the auxiliary electrodes 18 are thinned by an etching process, to thereby form the wiring portion in a narrow frame portion. In the related art, a relay wiring line formed of a silver paste has a thickness of 20 μm and a line width of 1 mm. In contrast, when APC (AgPdCu alloy having resistivity of $4 \times 10^{-6}$ Ωcm) is used in the wiring portion, a relay wiring line can be formed to have a thickness of 0.2 μm and a line width of 0.1 mm. Furthermore, the resistivities (Ωcm) of copper, aluminum, and chromium are approximately $6 \times 10^{-6}$, $6 \times 10^{-6}$, and $5 \times 10^{-5}$, respectively. Accordingly, even if those metals are used, the line width can be reduced by one digit or two digits, compared with the related art.

On the planar electrode 12b of the rear substrate 8b, a buffer member 15 formed of a resin material is arranged and formed. The buffer member 15 is preferably formed of an elastic material, such as silicon or urethane (for example, a material having an elastic modulus ranging from $1 \times 10^4$ N/m$^2$ to $1 \times 10^8$ N/m$^2$). The buffer member 15 may be formed on the planar electrode 12b by a photolithography method or a printing method. This buffer structure also serves as a spacer that controls the gap between the substrates $8a$ and $8b$.

As the film member 30 that is adhered onto the touch panel 4, a film member formed of a transparent resin material, such as polyethylene (for example, polyethylene terephthalate (PET)), polyester, or polypropylene, may be used. In the input device 40A, during a coordinate input operation on the touch panel 4, the input tool 3 or the finger slides on the surface of the film member 30, or a display unit, such as a liquid crystal panel, is provided on the rear side of the touch panel 4 (an opposite side to the film member 30) and is used as a display device. For this reason, for the film member 30, a material that can favorably prevent abrasion by the operation or damage of the cover member 45 or the surface of the touch panel 4, and can obtain good transmittance is preferably used.

As the adhesive (adhesive compound) that is provided between the film member 30 and the touch panel 4, various adhesive compounds, such as acrylic adhesive compounds, rubber-based adhesive compounds, and silicon-based adhesive compounds, may be used. In this embodiment, since the film member 30 and the touch panel 4 are optically adhered to each other, a silicon-based adhesive compound is preferably used.

The light-shielding film 46 that is formed on a side surface of the cover member 45 of the film member 30 is a colored film that is formed by coating a black material or a white material by, for example, printing. In this embodiment, the light-shielding film 46 serves as a blinder of a region where the sealing material 9 of the touch panel 4 is formed, or a portion where the terminal portion 16 is formed. When a display unit, for example, a liquid crystal panel is provided on the rear side of the touch panel 4 (the opposite side to the film member 30), the light-shielding film 46 serves as a peripheral partition during display. The light-shielding film 46 may be formed of a material having an arbitrary color insofar as it has a light-shielding property, and may be patterned.

In addition to the light-shielding film 46, the film member 30 may be designed to have an arbitrary color and a predetermined pattern. Such design may be applied on any surface of the film member 30, but in view of printed matter protection, it is preferably applied to a surface of the film member 30 near the cover member 45.

The cover member 45 is composed of a plastic plate or a metal plate. Any base material may be used insofar as it has predetermined strength. The cover member 45 may be used as a member constituting an operating panel of an electronic apparatus, as well as a support of the touch panel 4. In this case, the cover member 45 can be used as an internal operating unit of the touch panel. In addition, when the input device 40A is used as an operating unit of an electronic apparatus, an operating button or a through-hole for a switch may be provided in the cover member 45. This processing may be easily performed by punching or cutting. Furthermore, since printing can be performed on the film member 30, character information, such as an explanation of the button or the switch, may be printed.

In the input device 40A of this embodiment having the above-described configuration, the touch panel 4 is disposed in the housing portion $45a$ that is formed in the cover member 45. In addition, the film member 30 is adhered over the main surface $4s$ of the touch panel 4 and the main surface $45s$ of the cover member 45. Accordingly, a step between an input operation surface of the touch panel 4 and a surface of the cover member 45 outside the input operation surface can be eliminated. Therefore, the degree of freedom in design can be improved, and thus an input device having an excellent design property can be obtained, compared with the related art.

Like the related art, when a step exists between the touch panel and the casing, dust may be collected at the step, or when water droplets are trapped, the water droplets may be likely to enter the casing through a space at the step. In contrast, in this embodiment, since the entire surface including the cover member 45 is covered with the film member 30, there is no case in which dust may be collected to degrade the appearance or in which water droplets may enter to cause a failure. Therefore, an input device having excellent reliability can be obtained.

The film member 30 is adhered to the front substrate $8a$ of the touch panel 4, which is formed of a thin glass substrate having a thickness of approximately 0.1 to 0.2 mm, through the adhesive 41. Accordingly, even if the front substrate $8a$ comes cracked due to being dropped or collision of foreign substances, the film member 30 can prevent pieces of broken glass from shattering. Therefore, an input device having excellent safety can be implemented. In particular, in this embodiment, since the film member 30 is adhered to cover a surface including the touch panel 4 and the cover member 45, the film member 30 is not liable to become separated. From this viewpoint, an input device having excellent safety can be implemented.

In the input device 40A of this embodiment, the touch panel 4 is disposed within the housing portion $45a$ that is provided to pass through the cover member 45. That is, the cover member 45 does not suppress the movement of the touch panel 4 in the substrate thickness direction. Accordingly, even if a manufacturing variation occurs in the thickness of the touch panel 4, the touch panel 4 and the cover member 45 can be adhered to the film member 30 such that the surface of the film member 30 is planarized.

An input operation of the touch panel 4 will now be described.

In the touch panel 4, an input control circuit (not shown) is connected to the terminal portion 16. At a predetermined point of time, the input control circuit applies a predetermined voltage between the low resistance films 14 and 14 that are located at both ends of the rear substrate $8b$ in the X direction. A voltage measuring unit (a voltage measuring circuit or a voltage measuring element) (not shown) is conductively connected between the low resistance films 13 and 13 that are located at both ends of the front substrate $8a$ in the Y direction. At this point of time, a voltage drop occurs in the planar electrode $12b$ of the rear substrate $8b$, in which a voltage is linearly changed in the X direction. Then, a voltage distribution is obtained in which the same potential appears at the places having the same position coordinate axis in the X direction. At this time, if a predetermined place on the coordinate input surface of the front substrate $8a$ is pressed by a tip of the input tool 3, the planar electrode $12a$ of the front substrate $8a$ and the planar electrode $12b$ of the rear substrate $8b$ are brought into contact with each other. Then, a voltage of the planar electrode $12b$ at a position corresponding to the place pressed by the input tool 3 is measured through the planar electrode $12a$ of the front substrate $8a$ by the input control circuit. Since the measured voltage correlates with the position coordinate in the X direction of the pressed place, the input control circuit can detect the position in the X direction of the place pressed by the input tool 3.

Meanwhile, at another point of time, the input control circuit applies a predetermined voltage between the low resistance films 13 and 13 that are located at both ends of the front substrate $8a$ in the Y direction, and the voltage measuring unit is connected between the low resistance films 14 and 14 that are located at both ends of the rear substrate $8b$ in the Y direction. At this point of time, a uniform voltage drop occurs in the planar electrode 12a of the front substrate 8a in the Y direction, and a voltage distribution is formed in which a voltage is linearly changed. The input control circuit detects a voltage on the planar electrode 12a of the front substrate 8a at a position corresponding to the place pressed by the input tool 3 through the planar electrode 12b of the rear substrate 8b. In this way, similarly to the position in the X direction, the position in the Y direction of the pressed place can be detected.

Two connection states to the input control circuit are repeatedly switched between within a short time. Then, the input control circuit can detect the position coordinate values in the X and Y directions of the pressed place by the input tool 3.

Further, the touch panel 4 of this embodiment is formed as a single body by bonding two glass substrates with the sealing material. Accordingly, the touch panel can be manufactured by the same method as a liquid crystal panel. For this reason, since substrates having substantially the same thicknesses as the two substrates of the liquid crystal panel are used as the substrate main bodies for the touch panel 4, and thus a manufacturing line of the touch panel 4 and a manufacturing line of the liquid crystal panel can be commonly used. However, since the front substrate 8a needs to be reduced in thickness to have flexibility for a coordinate input operation, after two substrates having a thickness of approximately 0.5 mm are bonded to each other, one substrate is preferably subject to an etching process to be reduced in thickness, for example, at a thickness of approximately 0.1 mm to 0.2 mm. If a substrate having a reduced thickness is used from the beginning of the manufacturing process, it may be difficult to handle the substrate, and the substrate may become cracked during the manufacturing process and be vulnerable to a mechanical impact. Accordingly, as described above, if only the front-side substrate main body 11a is reduced in thickness after the substrates are bonded with the sealing material 9, the above-described problems in the manufacturing process can be effectively prevented from occurring.

Second Example

In an input device 40B shown in FIG. 1B, in addition to an adhesive 41 between a touch panel 4 and a film member 30, an adhesive 42 is filled between the touch panel 4 and an inner wall of a housing portion 45a of a cover member 45 to surround the touch panel 4 in a frame shape. Accordingly, the touch panel 4 is fixed to both the film member 30 and the cover member 45.

According to the input device 40B that is provided with the adhesive 42 between the touch panel 4 and the cover member 45, in addition to the same advantages of the above-described input device 40A, the following advantages are obtained.

That is, the touch panel 4 is supported by the cover member 45, and thus the movements of the touch panel 4 in the substrate surface and thickness directions are suppressed. Accordingly, there is no case where the touch panel 4 is pressed down to the rear side by the input operation on the touch panel 4, or the touch panel 4 moves within the housing portion 45a due to an impact, such as being dropped. Therefore, an input device having excellent operationality and durability can be implemented.

Third Example

FIG. 4A is a schematic cross-sectional view of an input device 40C according to a third example of the first embodiment. FIG. 4B is a diagram showing the planar configuration of the input device 40C. FIG. 4A corresponds to FIGS. 1A and 1B, and FIG. 4B corresponds to FIG. 2.

The input device 40C of this example is different from the input device 40B of the second example in that an opening 30a is formed in a film member 30 that is formed over a cover member 45 and a touch panel 4. Accordingly, in FIGS. 4A and 4B, the same parts as those shown in FIGS. 1A and 1B are represented by the same reference numerals, and the detailed descriptions thereof will be omitted.

As shown in FIGS. 4A and 4B, the opening 30a of the film member 30 is formed in a rectangular shape along an edge of an opening 46a of a light-shielding film 46, which is formed to overlap a marginal portion of the touch panel 4. The opening 30a is formed to correspond to a planar region that serves an input operation portion of the touch panel 4. Accordingly, in the input device 40C, an input operation on the touch panel 4 is performed by directly sliding an input tool 3 or a finger on the front substrate 8a.

In the input device 40C of this example having the above-described configuration, the input operation on the touch panel 4 is performed by directly pressing the front substrate 8a. Accordingly, an operation pressure is reduced, compared with the input devices 40A and 40B of the first embodiment, in which the input operation is performed through the film member 30. Therefore, the input operation can be comfortably performed.

In this example, since the film member 30 is partially removed to form the opening 30a, a region where the film member 30 and the touch panel 4 are adhered to each other by an adhesive 41 is a marginal region of the touch panel 4 (front substrate 8a). The width of the marginal region depends on the size of the touch panel 4, but since the width of at least several mm can be generally secured, sufficient adhesion strength of the film member 30 and the touch panel 4 can be secured. However, as compared with the input devices 40A and 40B shown in FIGS. 1A and 1B, an adhesion area is narrow, and adhesion strength is lowered. Accordingly, in the input device 40C of this example, like the input device 40B, an adhesive 42 is preferably disposed in a space between the touch panel 4 and the cover member 45 to adhere the cover member 45 and the touch panel 4 to each other.

In this example, as shown in FIGS. 4A and 4B, the light-shielding film 46 formed on a surface of the film member 30 facing the cover member 45 is formed outside the opening 30a of the film member 30. In addition, the light-shielding film 46 is preferably covered with the adhesive 41 that adheres the film member 30 and the touch panel 4 to each other. With this configuration, the light-shielding film 46 is not exposed within the opening 30a. Therefore, separation at an interface of the light-shielding film 46 and the film member 30 can be prevented, and the light-shielding film 46 can be effectively protected.

In this example, the front substrate 8a of the touch panel 4 is exposed. Accordingly, if the substrate main body 11a of the front substrate 8a is a glass substrate, when the glass substrate is broken due to an impact, such as being dropped, broken pieces may shatter. Therefore, when the configuration of this example is used, a high-strength glass substrate or a plastic substrate is preferably used as the substrate main body 11a of the front substrate 8a. Alternatively, transparent resin may be coated on the surface of the substrate main body 11a to form a protective layer.

Fourth Example

Figure 5:
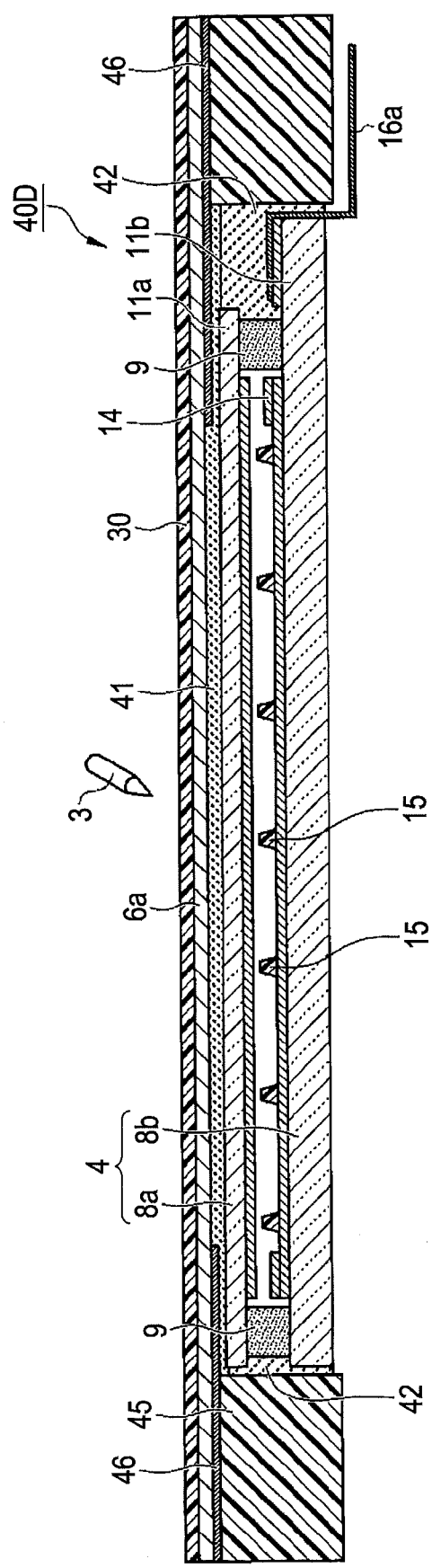
FIG. 5 is a diagram showing an input device according to a fourth example of the first embodiment.

FIG. 5 is a schematic cross-sectional view of an input device 40D according to a fourth example of the first embodiment. FIG. 5 corresponds to FIGS. 1A and 1B.

As shown in FIG. 5, in the input device 40D of this example, in addition to the basic configuration of the input device 40B according to the second example, a polarizing plate 6a is provided on a side of a film member 30 facing a cover member 45. The polarizing plate 6a may be used as an optical element of a display unit, such as a liquid crystal panel, which is provided on a rear side of a touch panel 4 (an opposite side to the film member 30).

According to the input device 40D having the above-described configuration, the polarizing plate 6a and the film member 30 are disposed on the front side of the touch panel 4. Accordingly, an operation pressure of the touch panel 4 increases, compared with a case where only the film member 30 is provided, but the touch panel 4 is reliably protected. In addition, even if the touch panel 4 having a glass substrate is broken, pieces of broken glass can be effectively prevented from shattering.

In this example, the polarizing plate 6a is disposed between the film member 30 and the light-shielding film 46, but the polarizing plate 6a may be disposed between the light-shielding film 46 and the cover member 45. Alternatively, the polarizing plate 6a may be disposed within the housing portion 45a, together with the touch panel 4. In addition, when the polarizing plate 6a has sufficient durability, the polarizing plate 6a may be used as a flexible member that is adhered to the touch panel 4 and the cover member 45, without providing the film member 30.

In addition to the polarizing plate, other optical elements may be disposed between the film member 30 and the cover member 45. For example, an optical element (circularly polarizing plate) that is formed by laminating the polarizing plate 6a and a $\lambda/4$ retardation film or the polarizing plate 6a, the $\lambda/4$ retardation film, and $\lambda/2$ retardation film may be disposed. Furthermore, an antireflection film or a light-diffusing film may be disposed.

Fifth Example

FIG. 6A is a schematic cross-sectional view of an input device 40E according to a fifth example of the first embodiment. FIG. 6A corresponds to FIGS. 1A and 1B.

As shown in FIG. 6A, in the input device 40E of this example, in addition to the basic configuration of the input device 40B according to the second example, a film member 31 (second flexible member) is adhered to cover a touch panel 4 and a cover member 45 on a rear surface of the touch panel 4 (an opposite side to the film member 30).

A flexible printed board 16a that leads terminals from the touch panel 4 is led outside through a slit-shaped opening that is provided in the film member 31.

As the film member 31, similarly to the film member 30, a film member formed of a resin material, such as polyethylene (for example, polyethylene terephthalate (PET)), polyester, or polypropylene, may be used. The adhesion of the film member can prevent the entire input device 40E from being thickened.

Preferably, the film member 31 is adhered to both the rear substrate 8b of the touch panel 4 and the cover member 45, and the film member 31 and the touch panel 4 are optically adhered to each other. Here, if at least the film member 31 and the cover member 45 are adhered to each other, the movement of the touch panel 4 in the substrate thickness direction is suppressed by the film member 31 and the film member 30. Accordingly, the film member 31 and the touch panel 4 may not be adhered to each other, and a gap may exist between the film member 31 and the touch panel 4.

According to the input device 40E having the above-described configuration, the film member 31 is disposed on the rear side of the touch panel 4, and the touch panel 4 is interposed between the film members 30 and 31. Accordingly, during an input operation on the touch panel 4, the touch panel 4 can be prevented from being pressed down by a pressing force by an input tool 3 or a finger.

As the film member 31, in addition to the above-described transparent film, a polarizing plate or a retardation film may be used. Furthermore, in addition to a single optical element, an optical element (circularly polarizing plate) that is formed by laminating a polarizing plate and a $\lambda/4$ retardation film or a polarizing plate, a $\lambda/4$ retardation film, and a $\lambda/2$ retardation film may be disposed. In addition, a light-diffusing film may be disposed.

Sixth Example

FIG. 6B is a schematic cross-sectional view of an input device 40F according to a sixth example of the first embodiment. FIG. 6B corresponds to FIGS. 1A and 1B.

As shown in FIG. 6B, in the input device 40F of this example, in addition to the basic configuration of the input device 40E according to the fifth example, an opening 31a is formed in a film member 31 (second flexible member) that is adhered on a rear side of a touch panel 4 (an opposite side to the film member 30). The opening 31a is formed to have a planar region that is substantially similar to an opening 46a of a light-shielding film 46 in plan view.

According to the input device 40F having the above-described configuration, the film member 31 is disposed on the rear side of the touch panel 4, and the touch panel 4 is interposed between the film members 30 and 31. Accordingly, during an input operation on the touch panel 4, the touch panel 4 can be prevented from being pressed down by a pressing force by an input tool 3 or a finger.

In addition, since the opening 31a is formed, for example, when a display unit, such as a liquid crystal panel, is disposed on the rear side of the touch panel 4, the film member 31 is not disposed in a region where display is performed through the touch panel 4. Accordingly, light loss or refraction by the film member 31 and reflection at the interface can be prevented, and thus bright and high-quality display can be realized.

In this embodiment, since the opening 31a is formed in the film member 31, the film member 31 supports the marginal portion of the touch panel 4. Accordingly, the film member 31 and the rear substrate 8b of the touch panel 4 are preferably adhered to each other such that the touch panel 4 is stably supported by the film member 31.

Although the above-described embodiment illustrates the configuration of the input device according to the invention, various changes can be made in the individual components.

For example, the touch panel 4 may have a buffer structure, in which a space defined by the front substrate 8a, the rear substrate 8b, and the sealing material 9 is filled with a refractive index adjusting liquid material. As the liquid material that is filled between the front substrate 8a and the rear substrate 8b, silicon oil having a difference in the refraction index from glass lower than that of air is preferably used.

If the liquid material is filled, when a display unit, such as a liquid crystal panel, is provided on the rear side of the touch panel, light that is emitted from the display unit can be prevented from being reflected from an interface of the rear substrate 8b and the space or an interface of the space and the front substrate 8a. Therefore, bright display through the touch panel 4 can be realized.

If the liquid material is filled between the substrates, it serves as a kind of cushion. Accordingly, even if an impact is applied to the front substrate 8a, it can be lessened by the liquid material. That is, in this embodiment, since the coordinate input surface of the front substrate 8a is more reduced in thickness than other portions, it is more vulnerable to a mechanical impact than a normal substrate. However, with the buffer structure, a corresponding portion can be reinforced, thereby compensating impact resistance. Considering the buffer function, viscosity of the liquid material is in a range of, for example, 2 mm²/s to 5000 mm²/s.

Instead of the resistive film-type touch panel 4, a capacitive touch panel may also be used. In case of the capacitive touch panel, what is necessary is that the thickness corresponds to a single glass substrate. Accordingly, the housing portion 45a of the cover member 45 or the cover member 45 itself can be reduced in thickness. Therefore, the entire input device 40A or 40B can be reduced in thickness.

Although, in this embodiment, the touch panel 4 is housed within the housing portion 45a that is formed to pass through the cover member 45, the structure of the housing portion 45a can be changed in various ways, for example, by the shape or the thickness of the touch panel 4. For example, a locking member, such as a protrusion, which protrudes into the housing portion 45a, may be provided in the cover member 45 to suppress the movement of the touch panel 4 in the substrate thickness direction.

When a display unit is not disposed on the rear side of the touch panel 4, the housing portion 45a may be a concave portion that is formed at one surface of the cover member 45. If the touch panel 4 is disposed within the housing portion 45a composed of the concave portion, the position of the touch panel 4 is easily suppressed, and flatness of the surface of the film member 30 that is adhered over the touch panel 4 and the cover member 45 is easily secured.

Second Embodiment

Next, an electro-optical device according to a second embodiment of the invention will be described with reference to FIGS. 7A, 8, and 9.

FIG. 7A is a schematic cross-sectional view showing a first example of a touch panel-integrated liquid crystal device that is an example of an electro-optical device according to a second embodiment of the invention. FIG. 8 is a schematic cross-sectional view showing a second example of the liquid crystal device according to the second embodiment of the invention. FIG. 9 is a schematic cross-sectional view showing a third example of the liquid crystal device according to the second embodiment of the invention.

Although, in this embodiment, a case where the input device 40B according to the second example of the first embodiment or the input device 40D according to the fourth example is used as an input device for a liquid crystal device is described, instead of the input device 40B or 40D, the input device 40A, 40C, 40E, or 40F of other examples may also be used.

First Example

A liquid crystal device 100A according to the first example shown in FIG. 7A includes a liquid crystal panel (electro-optical panel) 2 that serves as a display unit, and the input device 40B of the first embodiment that is provided on a front side of the liquid crystal panel 2 (an upper side in the drawing; an observation side).

As described above, the input device 40B includes the analog resistive film-type touch panel (input panel) 4, the cover member 45 that is provided with the housing portion 45a, in which the touch panel 4 is housed, and the film member 30 that is adhered to a main surface 45s of the cover member 45 and a main surface 4s of the touch panel 4 to cover the touch panel 4 and the cover member 45.

The liquid crystal panel 2 is optically adhered to the rear substrate 8b of the touch panel 4 by an adhesive 50 containing a translucent elastomer (for example, a translucent elastomer, such as silicon gel, acrylic gel, urethane gel, or urethane rubber, which has a difference in the refractive index from glass). If the adhesive 50 is formed of an elastomer, a pressing force when an input operation is performed on the touch panel 4 is absorbed by the elastomer. Therefore, it is possible to suppress display irregularity when the substrate of the liquid crystal panel 2 is distorted by the input operation. In order for the elastomer to absorb the pressing force, the thickness thereof is preferably in a range of 50 to 500 μm.

In addition, since the liquid crystal panel 2 is optically adhered to the rear substrate 8b of the touch panel 4, a gap (air layer) is not formed between the liquid crystal panel 2 and the rear substrate 8b of the touch panel 4. The adhesive 50 has a difference in the refractive index from glass lower than that of air. Accordingly, from environmental light incident from the front substrate (first substrate) of the touch panel 4, a light component reflected from the interface of the surface of the rear substrate (second substrate) 11b of the touch panel 4 and the air layer, and a light component reflected from the interface of the air layer and the surface of a front substrate (third substrate) 22a of the liquid crystal panel 2 can be suppressed. Therefore, vivid display can be performed with little reflection. To achieve this effect, the refractive index of the elastomer contained in the adhesive 50 needs to approximate the refractive index of a glass substrate or a plastic substrate constituting the touch panel 4 or the liquid crystal panel 2. The refractive index is preferably in a range of 1.4 to 1.9.

The liquid crystal panel 2 is formed as a single body by bonding a front substrate (third substrate) 22a and a rear substrate (fourth substrate) 22b, which face each other with a liquid crystal layer (electro-optical material) 32 interposed therebetween, with a sealing material 23, which is provided in the marginal portions of the two substrates in a ring shape. In the front substrate 22a that is disposed on an observation side, a liquid crystal control layer having front-side electrodes 26a formed of a transparent conductive material or an alignment film (not shown) is formed on a surface of a substrate main body 24a formed of a transparent substrate facing the liquid crystal layer. In the rear substrate 22b that is disposed on an opposite side to the observation side (an opposite side to the front substrate 22a with the liquid crystal layer 32 interposed therebetween), a liquid crystal alignment control layer having rear-side electrodes 26b formed of a transparent conductive material or an alignment film (not shown) is formed on a surface of a substrate main body 24b formed of a transparent substrate facing the liquid crystal layer.

Distributed between the front substrate 22a and the rear substrate 22b are granular spacers 29 that uniformly maintains a distance (cell gap) between the substrates 22a and 22b. The liquid crystal panel 2 may be a passive matrix type or an active matrix type. The liquid crystal alignment mode may be any one of various known modes, such as TN (Twisted Nematic), VAN (Vertically Aligned Nematic), STN (SuperTwisted Nematic), ferroelectric, or antiferroelectric. In addition, color filters may be disposed on one of the two substrates to perform color display. Furthermore, a reflective film may be formed on the rear substrate 22b to construct a reflective liquid crystal display. Furthermore, transmissive portions, such as openings or slits, may be formed in the reflective film to construct a transflective liquid crystal display.

On the front substrate 22a, an extended portion 24c is provided to extend toward the circumference of the rear substrate 22b. The extended portion 24c is used as a mounting-terminal forming region. A wiring pattern (not shown) is formed in the extended portion 24c, and the front-side electrode 26a of the front substrate 22a and the rear-side electrodes 26b of the rear substrate 22b are electrically connected to the wiring pattern of the extended portion 24c through wiring pattern or conducting members (not shown). To the wiring pattern of the extended portion 24c, a liquid crystal driving IC (electronic part) 36 that electrically drives the liquid crystal panel 2 is mounted in a COG (Chip On Glass) manner. As the mounting structure of the liquid crystal driving IC 36, in addition to the COG mounting structure, other mounting structures, such as an FPC mounting structure and the like, may be used.

In this embodiment, the touch panel 4 and the liquid crystal panel 2 are arranged such that the extended portion 24c of the liquid crystal panel 2 overlaps a region where the terminal portion 16 of the touch panel 4 is formed (a region where the rear substrate 8b is extended more than the front substrate 8a) in plan view. With this arrangement, a frame region of the liquid crystal panel 2 is also blinded by the light-shielding film 46. In addition, a region where the rear substrate 8b of the touch panel 4 and the front substrate 22a of the liquid crystal panel 2 overlap each other can be maximized, thereby improving adhesion reliability of the touch panel 4 and the liquid crystal panel 2. Furthermore, since a region where connection terminals to an external circuit are formed is disposed near the touch panel 4 and the liquid crystal panel 2, the collection with the external circuit can be easily performed.

Though not shown, polarizing plates are provided on the outer surfaces of the front substrate 22a and the rear substrate 22b of the liquid crystal panel 2, respectively. One of the pair of polarizing plates may be formed on the substrate main body 24a or the substrate main body 24b facing the liquid crystal layer 32. In addition, an illumination device (backlight) is provided outside the rear substrate 22b.

According to the liquid crystal device 100A of this example having the above-described configuration, the input device 40B of the first embodiment, and the liquid crystal panel 2 that is adhered to the touch panel 4 of the input device 40B are provided. Therefore, display through the touch panel 4 can be performed.

In addition, since the liquid crystal panel 2 is disposed on the rear side of the touch panel 4, the movement of the touch panel 4 in the substrate thickness direction is suppressed by the liquid crystal panel 2 or the casing supporting the liquid crystal panel 2. Therefore, the touch panel 4 can be prevented from being pressed down by a pressing force during an input operation.

In the liquid crystal device of this embodiment, a display surface can be planarized by the film member 30, and printing can be appropriately performed on the film member 30. Therefore, a liquid crystal device that has a high degree of freedom in design and an excellent design property is obtained.

In the liquid crystal device of this embodiment, since the film member 30 is disposed on the front side of the touch panel 4, the touch panel 4 that has the front substrate 8a formed of a glass substrate can be safely used. In case of a touch panel that uses a glass substrate for the two substrate main bodies 11a and 11b, high transmittance is obtained, compared with a case where the substrate main body 11a is a plastic substrate or the substrate main bodies 11a and 11b are plastic substrates. Accordingly, bright and high-quality display can be realized, compared with the related art.

Although, in this embodiment, the liquid crystal panel 2 protrudes from the cover member 45, if the cover member 45 has a sufficient thickness, the liquid crystal panel 2 may be housed in the housing portion 45a of the cover member 45, together with the touch panel 4. With this configuration, an adhesive may be disposed between the cover member 45 and the liquid crystal panel 2 to adhere the cover member 45 and the liquid crystal panel 2 to each other. Accordingly, both the touch panel 4 and the liquid crystal panel 2 can be stably supported by the cover member 45. In addition, when a backlight is provided on the rear side of the liquid crystal panel 2 (an opposite side to the touch panel 4), the backlight may also be housed in the housing portion 45a.

Like this embodiment, if the touch panel 4 is disposed on the front side of the liquid crystal panel 2, when an input operation is performed by pressing the surface of the touch panel 4 with the input tool 3, display on the liquid crystal panel 2 may be distorted. This is because the touch panel 4 is partially deformed due to the pressing force during the input operation, and the front substrate 22a of the liquid crystal panel 2 on the rear side of the touch panel 4 is slightly deflected. That is, since the gap of the liquid crystal panel 2 is in a range of approximately 1 µm to 10 µm, even if the front substrate 22a is slightly deflected, this deflection changes the gap of the liquid crystal panel 2 at a partially high rate. As a result, a display distortion, such as an interference fringe, may occur.

This problem can be resolved by sufficiently reducing the thickness of the rear substrate 22b of the liquid crystal panel 2. For example, the rear substrate 22b is reduced in thickness to approximately 0.1 mm to 0.4 mm such that the substrate is easily deflected. In this case, as described above, when the front substrate 22a of the liquid crystal panel 2 is deflected, the rear substrate 22b is deflected accordingly, such that the change of the gap is little. However, if the substrate is reduced in thickness, it may be hard to handle the substrate, and the substrate may come cracked during the manufacturing process. In addition, since the substrate is vulnerable to the mechanical impact, when the touch panel is used for portable devices, it is likely to be damaged by the impact, such as being dropped. As such, in view of ease of handling the substrate or impact resistance, the substrate is preferably thick, while, in view of display quality, the substrate is preferably thin.

Thus, in order to meet both demands, the liquid crystal panel 2A shown in FIG. 7B can be used. In the liquid crystal panel 2A, a thick glass substrate is used for the front substrate 22a to improve the ease of handling. In addition, a concave portion H (thin-plate region) is formed in a portion of the rear substrate 22b corresponding to the display region to thin the rear substrate 22b and to make the rear substrate 22b follow the deformation of the front substrate 22a during the input operation. Specifically, the thickness of each of the front substrate 22a and the rear substrate 22b (a portion where the concave portion is not formed) is set to approximately 0.5 mm, and the thickness of the portion of the rear substrate 22b where the concave portion is formed is set to approximately 0.1 mm to 0.4 mm.

As described above, when the concave portion H is formed in the rear substrate 22b of the liquid crystal panel 2, as shown in FIG. 7B, the polarizing plate 6b is preferably housed within the concave portion H. In addition, when an optical film, such as a retardation film, which is used together with the polarizing plate, is provided, the optical film may be housed within the concave portion H, together with the polarizing plate. With this configuration, the liquid crystal device 100A can be reduced in thickness by the thickness of the optical film, such as the polarizing plate.

Second Example

Next, a second example of this embodiment will be described with reference to FIG. 8.

Figure 8:
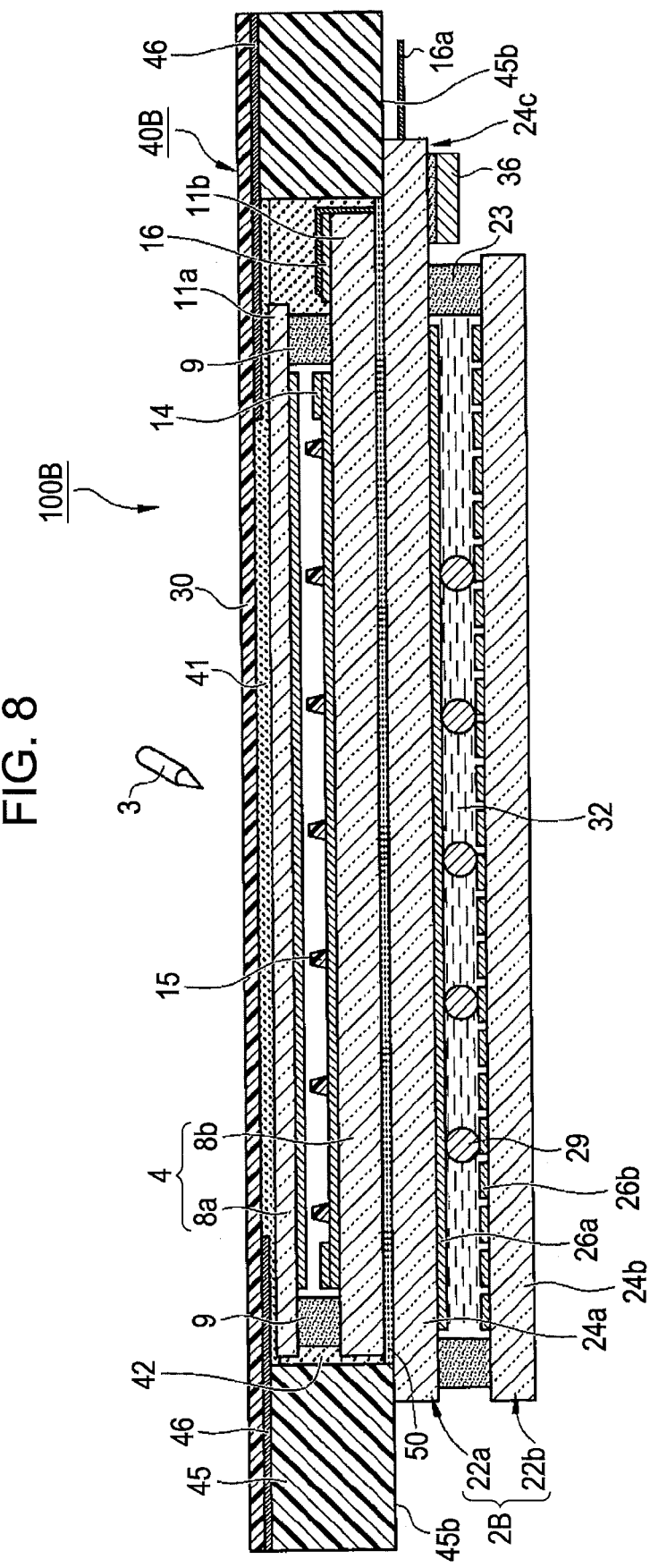
FIG. 8 is a schematic cross-sectional view showing a liquid crystal device according to a second example of the second embodiment.

As shown in FIG. 8, a liquid crystal device 100B of the second example includes the input device 40B of the first embodiment and the liquid crystal panel 2B. The liquid crystal panel 2B has the same basic configuration as the liquid crystal panel 2A of the first example, except that the panel size is different. Specifically, in the liquid crystal panel 2B, a front substrate 22a has a planar area larger than the housing portion 45a of the cover member 45.

The liquid crystal panel 2B is adhered to the rear substrate 8b of the touch panel 4 by an adhesive 50, and is also adhered to a rear surface 45b of the cover member 45. As the method that adheres the cover member 45 and the liquid crystal panel 2 to each other, in addition to a method that separately coats an adhesive between the cover member 45 and the liquid crystal panel 2 to adhere the cover member 45 and the liquid crystal panel 2 to each other, the following methods may be used: a method that extends the adhesive 50 onto the cover member 45 to adhere the cover member 45 and the liquid crystal panel 2 to each other by the adhesive 50; and a method that extends the adhesive 42, which adheres the touch panel 4 and the cover member 45 to each other, onto the rear surface 45b of the cover member 45 to adhere the cover member 45 and the liquid crystal panel 2 to each other.

In the liquid crystal device 100B of this example having the above-described configuration, the front substrate 22a of the liquid crystal panel 2 that is provided on the rear side of the touch panel 4 is adhered to the rear surface 45b of the cover member 45. Accordingly, the touch panel 4 is fixed and stably held in a space that is defined by the film member 30, the liquid crystal panel 2, and the cover member 45.

In the second example shown in FIG. 8, the adhesive 50 that adheres the liquid crystal panel 2 and the touch panel 4 to each other may be removed.

In the second example shown in FIG. 8, the liquid crystal panel 2, the touch panel 4, and the cover member 45 are adhered to each other by the adhesive 50 and the adhesive 42. Accordingly, the liquid crystal panel 2 and the touch panel 4 are most stably supported. Meanwhile, in the configuration that the individual components are adhered to each other by the adhesives, the number of steps is large, and a lot of raw materials are required. In this example, the adhesive 50 that adheres the touch panel 4 and the liquid crystal panel 2 to each other may be removed, thereby reducing the number of steps and manufacturing the liquid crystal device at low cost.

With this configuration, a gap (air layer) is formed between the touch panel 4 and the liquid crystal panel 2. Accordingly, the pressing force during the input operation on the touch panel 4 rarely reaches the liquid crystal panel 2. Therefore, display irregularity due to the distortion of the liquid crystal panel 2 can be prevented from occurring.

Third Example

Next, a third example of this embodiment will be described with reference to FIG. 9.

Figure 9:
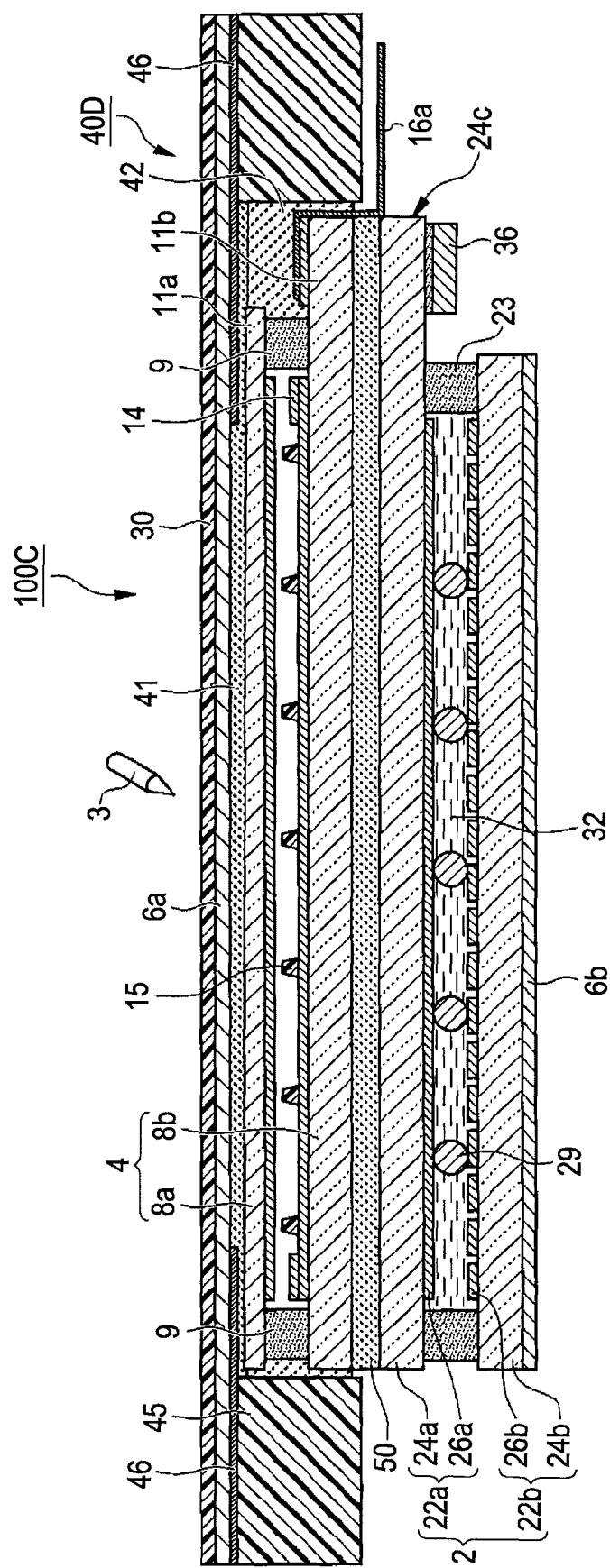
FIG. 9 is a schematic cross-sectional view showing a liquid crystal device according to a third example of the second embodiment.

A liquid crystal device 100C of the third example shown in FIG. 9 has the same configuration as the liquid crystal device 100A of the first example, except that the arrangement of the polarizing plate is changed.

As shown in FIG. 9, the liquid crystal device 100C of this example includes an input device 40D and a liquid crystal panel 2.

In the input device 40D, in addition to the basic configuration of the input device 40B according to the second example of the first embodiment, a front-side polarizing plate (first polarizing plate) 6a is provided on a side of the film member 30 facing the cover member 45.

On a side of the rear substrate 22b of the liquid crystal panel 2 opposite to the liquid crystal layer 32, a rear-side polarizing plate (second polarizing plate) 6b that pairs up with the front-side polarizing plate 6a is provided.

That is, in the liquid crystal device 100C of this example, from the pair of polarizing plates that are provided on the front and rear surfaces of the liquid crystal panel, a polarizing plate that is disposed on the front surface is disposed outside the touch panel 4.

According to the liquid crystal device 100C having the above-described configuration, the front-side polarizing plate 6a and the film member 30 are disposed on the front side of the touch panel 4 (an opposite side to the liquid crystal panel 2). Accordingly, an operation pressure against the touch panel 4 is increased, compared with a case where only the film member 30 is provided, but the touch panel 4 can be reliably protected. In addition, even if the touch panel 4 having a glass substrate is broken, the pieces of broken glass can be effectively prevented from shattering.

Furthermore, since the front-side polarizing plate 6a is disposed outside the touch panel 4, the total thickness of the touch panel 4 and the liquid crystal panel 2 that are disposed on the rear side (an opposite side to the film member 30) from the housing portion 45a of the cover member 45 can be reduced. Therefore, in an electronic apparatus including the liquid crystal device 100C, a space within the casing can be saved, and thus the size of the casing can be reduced.

Although, in this example, the front-side polarizing plate 6a is disposed between the film member 30 and the light-shielding film 46, the front-side polarizing plate 6a may be disposed between the light-shielding film 46 and the cover member 45. Alternatively, the front-side polarizing plate 6a may be disposed within the housing portion 45a, together with the touch panel 4. In addition, when the front-side polarizing plate 6a has sufficient durability, the front-side polarizing plate 6a may be used as a flexible member that is adhered to the touch panel 4 and the cover member 45, without providing the film member 30.

Third Embodiment

Figure 10A:
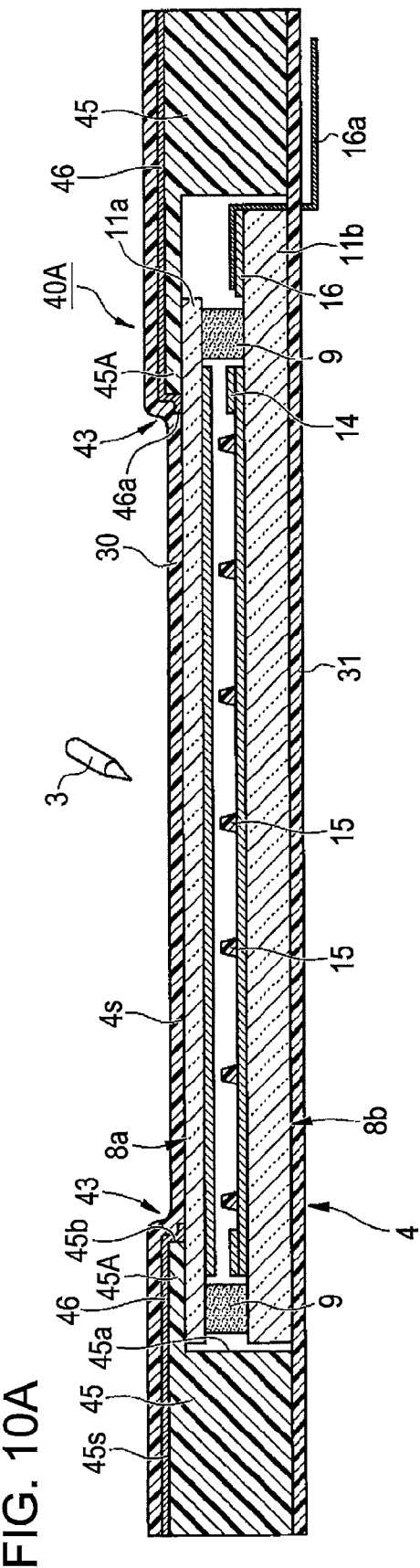
FIGS. 10A and 10B are schematic cross-sectional views showing input devices according to first and second examples of a third embodiment of the invention, respectively, taken along the line X-X of FIG. 11.
Figure 10B:
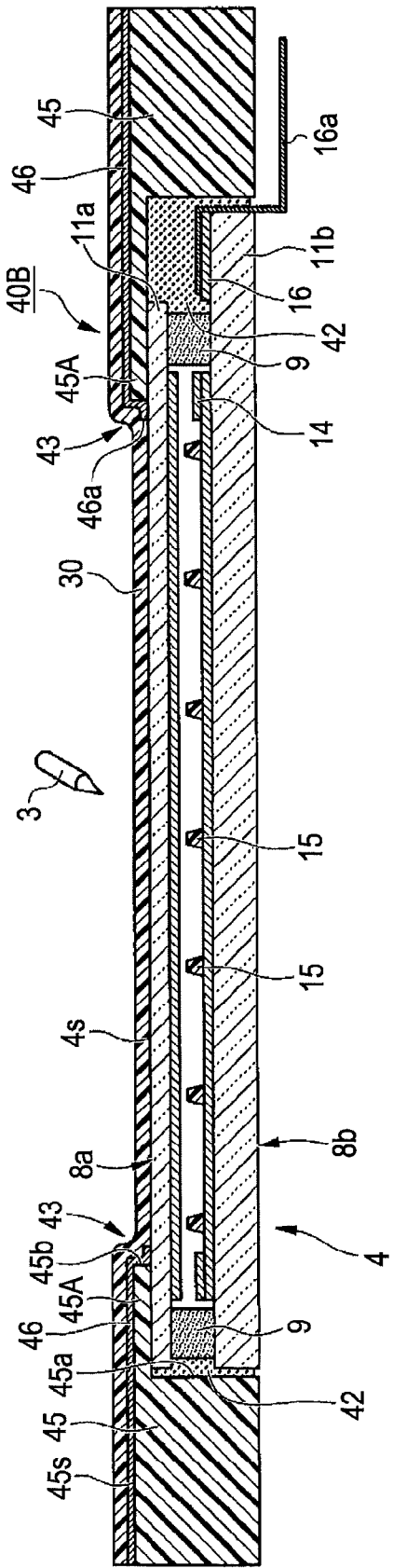
Figure 11:
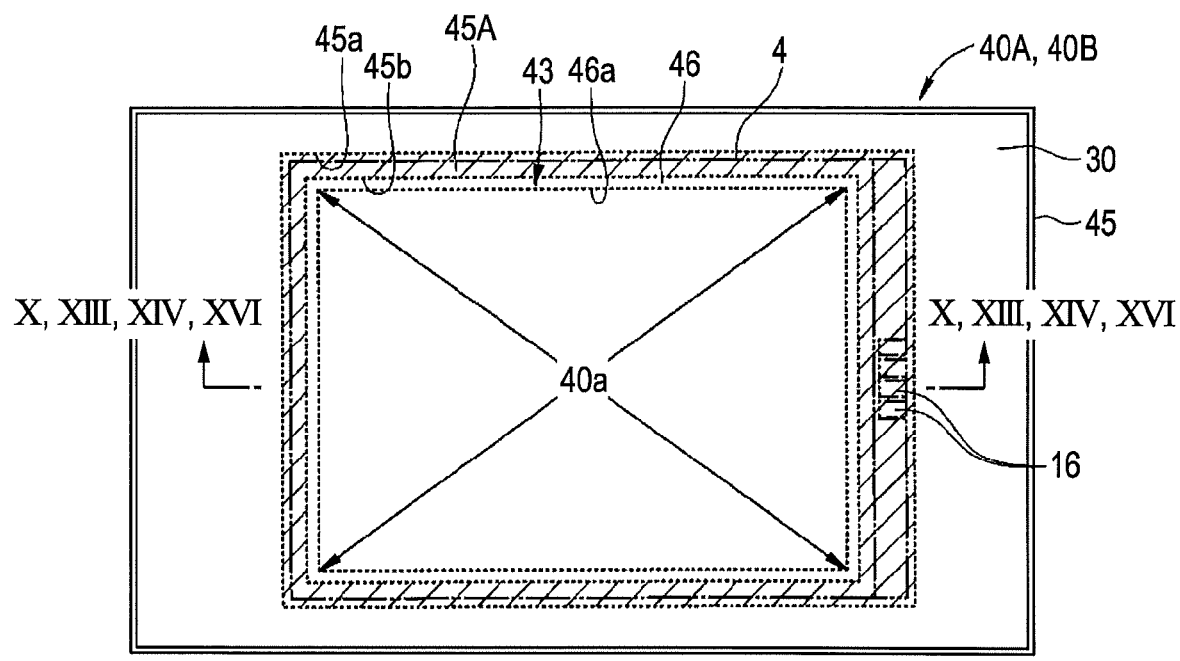
FIG. 11 is a schematic plan view corresponding to FIG. 10A.
Figure 12:
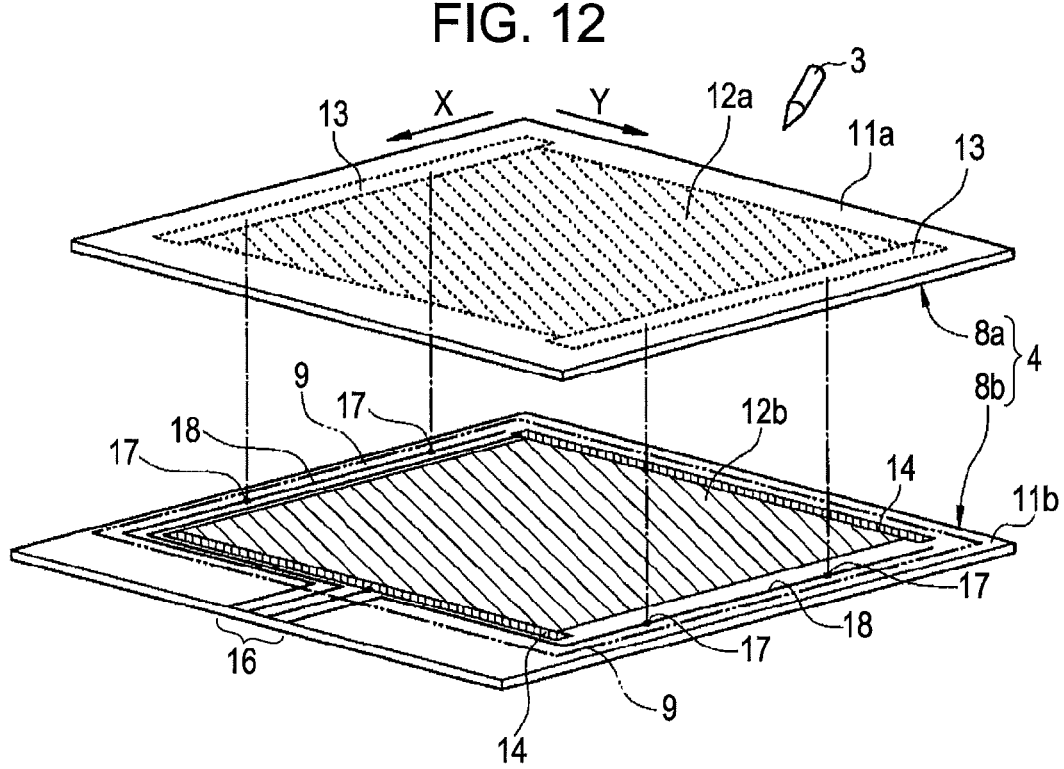
FIG. 12 is an exploded perspective view showing a touch panel according to the third embodiment.

FIG. 10A is a schematic cross-sectional view of an input device 40A according to a first example of a third embodiment of the invention. FIG. 10B is a schematic cross-sectional view of an input device 40B according to a second example of the third embodiment of the invention. FIG. 11 is a schematic plan view of the input device 40A shown in FIG. 10A. FIG. 12 is an exploded perspective view showing the structure of a touch panel 4.

First Example

As shown in FIGS. 10A and 11, the input device 40A of this embodiment includes a cover member 45 that has a plate shape in plan view, an analog resistive film-type touch panel (input panel) 4 that is disposed in a housing portion 45a composed of a rectangular opening in the cover member 45, and a film member 30 that is adhered over a main surface 45s of the cover member 45 (a front side of FIG. 11) and a main surface 4s of the touch panel 4.

At the end on the main surface 45s of the housing portion 45a of the cover member 45, a panel support 45A (indicated by a hatched region in FIG. 11), which has a frame shape in plan view, is formed to extend from an inner wall of the housing portion 45a. The panel support 45A supports the touch panel 4 by pressing the marginal portion of the touch panel 4 from the film member 30 side. The panel support 45A has a rectangular opening 45b on the touch panel 4.

On a side of the film member 30 facing the cover member 45, a light-shielding film 46 is formed by, for example, printing. The light-shielding film 46 has a rectangular opening 46a within a planar region corresponding to an input portion 40a of the touch panel 4. The light-shielding film 46 is formed to cover the cover member 45 in plan view. The opening 46a of the light-shielding film 46 is disposed inner than the opening the 45b along an inner circumference of the opening 45b of the panel support 45A.

The thickness of the touch panel 4 is substantially similar to the depth of the housing portion 45a of the cover member 45. In a state where the touch panel 4 is housed within the housing portion 45a of the cover member 45, the main surface 4s of the touch panel 4 and an inner surface of the panel support 45A (a surface facing the touch panel 4) are in contact with each other. In addition, a rear-side film member 31 that is adhered over a rear surface of the touch panel 4 (a surface opposite to the film member 30) and a rear surface of the cover member 45 (a surface opposite to the film member 30) is provided on the rear side of the touch panel 4 (an opposite side to the film member 30). That is, in the input device 40A, the touch panel 4 is supported by the cover member 45 while being interposed between the frame-shaped panel support 45A and the rear-side film member 31, such that the movement of the touch panel 4 in its thickness direction is suppressed.

A flexible printed board 16a that leads terminals from the touch panel 4 is led outward through a slit-shaped opening (not shown) in the rear-side film member 31. As the rear-side film member 31, similarly to the film member 30, a film member formed of a transparent resin material, such as poly-ethylene (for example, polyethylene terephthalate (PET)), polyester, or polypropylene, may be used.

The film member 30 that is disposed to cover the cover member 45 and the touch panel 4 in plan view is adhered to the cover member 45 and the touch panel 4 to follow a step that is formed at the boundary of the main surface 45s of the cover member 45 and the main surface 4s of the touch panel 4, which is exposed within the opening 45b of the panel support 45A.

That is, the film member 30 has a flat surface on the cover member 45 and the panel support 45A, which have a flat surface, and the touch panel 4. Meanwhile, at the step between the main surface 4s of the touch panel 4 formed by the opening 45b of the panel support 45A and the main surface 45s of the cover member 45, the film member 30 is deformed to come into close contact with the surfaces of members constituting the step. As a result, a step portion 43 is formed at the surface of the film member 30.

Although a detailed description will be given below, the film member 30 is temporarily softened by a thermal welding method or a vacuum thermal welding method. Then, the film member 30 can easily come into close contact with the touch panel 4 and the cover member 45.

The touch panel 4 is formed as a single body by bonding a front substrate (first substrate) 8a and a rear substrate (second substrate) 8b, which face each other with a predetermined gap therebetween, with a sealing material 9, which is provided in the marginal portions of the two substrates 8a and 8b in a ring shape.

As shown in FIG. 12, on the front substrate 8a of the touch panel 4, a uniform planar electrode (high resistance film; first electrode) 12a formed of a transparent conductive material is formed at an inner wall of a substrate main body 11a (a surface facing the rear substrate) formed of a transparent base material. In addition, a pair of low resistance films 13 are formed at both ends of the planar electrode 12a in the Y direction of FIG. 12 (two opposing sides of the rectangular planar electrode 12a). The low resistance films 13 formed on the front substrate 8a are conductively connected to auxiliary electrodes 18, which are formed on the rear substrate 8b, through conductive members 17, and are extended to a terminal portion 16 through the auxiliary electrodes 18. The low resistance films 13 and 14 and the auxiliary electrodes 18 constitute a wiring portion of the touch panel 4, and are formed along the marginal portion of the substrate 8a or the substrate 8b.

On the rear substrate 8b of the touch panel 4, a uniform planar electrode (high resistance film; second electrode) 12b formed of a transparent conductive material is formed on an inner surface of a substrate main body 11b (a surface facing the front substrate) formed of a transparent base material. In addition, a pair of low resistance films 14 are formed at both ends of the planar electrode 12b in the X direction (two opposing sides of the rectangular planar electrode 12b). The terminal portion 16, to which wiring lines led from the low resistance films 13 and the low resistance films 14 are connected, is formed at an edge of the rear substrate 8b.

As shown in FIG. 10A, a flexible printed board 16a is adhered to the terminal portion 16 through an ACP (Anisotropic Conductive Paste) or an ACF (Anisotropic Conductive Film), such that the terminal portion 16 and an external control circuit are electrically connected with each other.

In this embodiment, a planar region on the outer surface of the front substrate 8a that corresponds to a region, in which the planar electrode 12a is formed, becomes a coordinate input surface (an operating surface, on which a user directly indicates a position on the touch panel with an input tool 3 or his/her finger).

For the substrate main bodies 11a and 11b that constitute the front substrate 8a and the rear substrate 8b, respectively, a hard glass substrate is used. If the glass substrate is used for the front substrate 8a, the substrate or the electrode can be prevented from deteriorating, compared with a case where a plastic substrate is used for the front substrate. Meanwhile, the hard glass substrate has flexibility inferior to that of a plastic film substrate. For this reason, if an input load is small, an input may not be sufficiently performed. Therefore, in this embodiment, the glass substrate is formed thin to have a thickness of 0.1 mm to 0.2 mm, thereby resolving a problem in operationality. As the substrate main body 11b constituting the rear substrate 8b, one having the same thickness as a liquid crystal panel is used. For example, in this example, the rear substrate 8b of the touch panel 4 has a thickness of approximately 0.5 mm.

The planar electrodes 12a and 12b are formed of a transparent conductive film, such as ITO (Indium Tin Oxide), and have uniform surface resistance over their entire surfaces. In addition, the low resistance films 13 and 14, the auxiliary electrodes 18, and the terminal portion 16 are formed of a metal thin film having high conductivity, such as Au, Ag, Cu, Al, or Cr, or an alloy containing one or more metals.

In this embodiment, since the glass substrate is used as the substrate main body of the front substrate 8a or the rear substrate 8b, unlike a known touch panel that uses a plastic film substrate, a high-temperature heat treatment or an etching process using a strongly acidic etchant can be performed. For this reason, in this embodiment, the conductive films for detecting coordinate information (the planar electrodes 12a and 12b, the auxiliary electrodes 18, and the terminal portion 16) are all formed using a vacuum process, such as a sputtering method or a deposition method. In addition, the low resistance films 13 and 14 and the auxiliary electrodes 18 are thinned by an etching process, to thereby form the wiring portion in a narrow frame portion. In the related art, a relay wiring line formed of a silver paste has a thickness of 20 μm and a line width of 1 mm. In contrast, when APC (AgPdCu alloy having resistivity of $4 \times 10^{-6}$ Ωcm) is used in the wiring portion, a relay wiring line can be formed to have a thickness of 0.2 μm and a line width of 0.1 mm. Furthermore, the resistivities (Ωcm) of copper, aluminum, and chromium are approximately $6 \times 10^{-6}$, $6 \times 10^{-6}$, and $5 \times 10^{-5}$, respectively. Accordingly, even if those metals are used, the line width can be reduced by one or two orders of magnitude, compared with the related art.

On the planar electrode 12b of the rear substrate 8b, a buffer member 15 formed of a resin material is arranged and formed. The buffer member 15 is preferably formed of an elastic material, such as silicon or urethane (for example, a material having an elastic modulus ranging from $1\times10^4$ N/m$^2$ to $1\times10^8$ N/m$^2$). The buffer member 15 may be formed on the planar electrode 12b by a photolithography method or a printing method. This buffer structure also serves as a spacer that controls the gap between the substrates 8a and 8b.

As the film member 30 that is adhered onto the touch panel 4, a film member formed of a transparent resin material, such as polyethylene (for example, polyethylene terephthalate (PET)), polyester, or polypropylene, may be used. In the input device 40A, during a coordinate input operation on the touch panel 4, the input tool 3 or the finger slides on the surface of the film member 30, or a display unit, such as a liquid crystal panel, is provided on the rear side of the touch panel 4 (an opposite side to the film member 30) and is used as a display device. For this reason, for the film member 30, a PET film that can favorably prevent abrasion by the operation or damage of the cover member 45 or the surface of the touch panel 4, and can obtain good transmittance is preferably used.

The light-shielding film 46 that is formed on a side surface of the cover member 45 of the film member 30 is a colored film that is formed by coating a black material or a white material by, for example, printing. In this embodiment, the light-shielding film 46 serves as a blinder of a region where the sealing material 9 of the touch panel 4 is formed, or a portion where the terminal portion 16 is formed. When a display unit, for example, a liquid crystal panel is provided on the rear side of the touch panel 4 (the opposite side to the film member 30), the light-shielding film 46 serves as a peripheral partition during display. The light-shielding film 46 may be formed of a material having an arbitrary color insofar as it has a light-shielding property, and the surface of the light-shielding film 46 facing the film member 30 may be patterned.

In addition to the light-shielding film 46, the film member 30 may be designed to have an arbitrary color and a predetermined pattern. Such design may be applied on any surface of the film member 30, but in view of printed matter protection, it is preferably applied to a surface of the film member 30 near the cover member 45.

The cover member 45 is composed of a plastic plate or a metal plate. Any base material may be used insofar as it has predetermined strength. The cover member 45 may be used as a member constituting an operating panel of an electronic apparatus, as well as a support of the touch panel 4. In this case, the cover member 45 can be used as an internal operating unit of the touch panel. In addition, when the input device 40A is used as an operating unit of an electronic apparatus, an operating button or a through-hole for a switch may be provided in the cover member 45. This processing may be easily performed by punching or cutting. Furthermore, since printing can be performed on the film member 30, character information, such as an explanation of the button or the switch, may be printed.

In the input device 40A of this embodiment having the above-described configuration, the touch panel 4 is disposed in the housing portion 45a that is formed in the cover member 45. In addition, the film member 30 is adhered over the main surface 4s of the touch panel 4 and the main surface 45s of the cover member 45. In addition, the film member 30 comes into close contact with to follow the step between the main surface 4s of the touch panel 4 and the main surface 45s of the cover member 45. In the relate art, the cover member (or the casing) and the touch panel, which are formed of different materials, are disposed with clear boundary and step. In contrast, in this embodiment, the surface of the film member 30 has a smoothly continuous step. For this reason, a surface having excellent appearance is obtained, compared with the related art. Furthermore, the degree of freedom in design can be improved, and an input device having an excellent design property can be implemented.

Like the related art, when a step exists between the touch panel and the casing, dust may be collected at the step, or when water droplets are trapped, the water droplets may be likely to enter the casing through a space at the step. In contrast, in this embodiment, since the entire surface including the cover member 45 is covered with the film member 30, there is no case in which dust may be collected to degrade the appearance or in which water droplets may enter to cause a failure. Therefore, an input device having excellent reliability can be obtained.

In this embodiment, in order to achieve good adhesiveness of the film member 30 to the step between the main surface 45s of the cover member 45 and the main surface 4s of the touch panel 4, the opening 45b of the panel support 45A that forms the step has preferably a shape that is widened toward the film member 30, that is, a shape the side end surface of which is inclined in cross-sectional view (tapered shape).

The film member 30 comes into close contact with the front substrate 8a of the touch panel 4 that is formed of a thin glass substrate having a thickness of approximately 0.1 to 0.2 mm. Accordingly, even if the front substrate 8a comes cracked due to being dropped or collision of a foreign substance, the film member 30 can prevent the pieces of broken glass from shattering, thereby implementing an input device having excellent safety. Particularly, in this embodiment, since the film member 30 is adhered to cover a surface including the touch panel 4 and the cover member 45, the film member 30 is not liable to become separated. From this viewpoint, excellent safety can be realized.

In the input device 40A of this embodiment, the movement of the touch panel 4 toward the film member 30 is suppressed by the panel support 45A of the cover member 45. Therefore, even if a manufacturing variation occurs in the thickness of the touch panel 4, there is no case where the height of the step between the main surface 45s of the cover member 45 and the main surface 4s of the touch panel 4 varies, such that the film member 30 can stably come into close contact with the step. As a result, the input device can be manufactured with good yield.

In this embodiment, the touch panel 4 is housed in the housing portion 45a while coming into contact with the panel support 45A, and the touch panel 4 is fixed by the rear-side film member 31 that is adhered to the rear side of the cover member 45. With this fixing method, the touch panel 4 can be mounted with a simple process.

An adhesive may be provided between the main surface 45s of the cover member 45 and the film member 30 (light-shielding film 46) to adhere the cover member 45 and the film member 30 to each other. In addition, an adhesive may be provided between the main surface 4s of the touch panel 4 and a surface of the film member 30 facing the touch panel 4 to optically adhere the film member 30 and the touch panel 4 to each other.

As the adhesive (adhesive compound) that is provided between the film member 30 and the cover member 45 (and the touch panel 4), various adhesive compounds, such as acrylic adhesive compounds, rubber-based adhesive compounds, and silicon-based adhesive compounds, may be used. When the film member 30 and the touch panel 4 are optically adhered to each other, a silicon-based adhesive compound is preferably used.

The input operation and the manufacturing process of the touch panel 4 are as described in the first embodiment.

Method of Manufacturing Input device of First Example

Next, the manufacturing method of the input device 40A according to the first example will be described with reference to FIGS. 13A to 13D and FIGS. 14A and 14B. FIGS. 13A to 13D and FIGS. 14A and 14B are schematic cross-sectional views showing the manufacturing process of the input device 40A. The cross-sectional views of FIGS. 13A to 13D or FIGS. 14A and 14B are taken along the line XIII-XIII or XIV-XIV of FIG. 11.

Figure 13A:
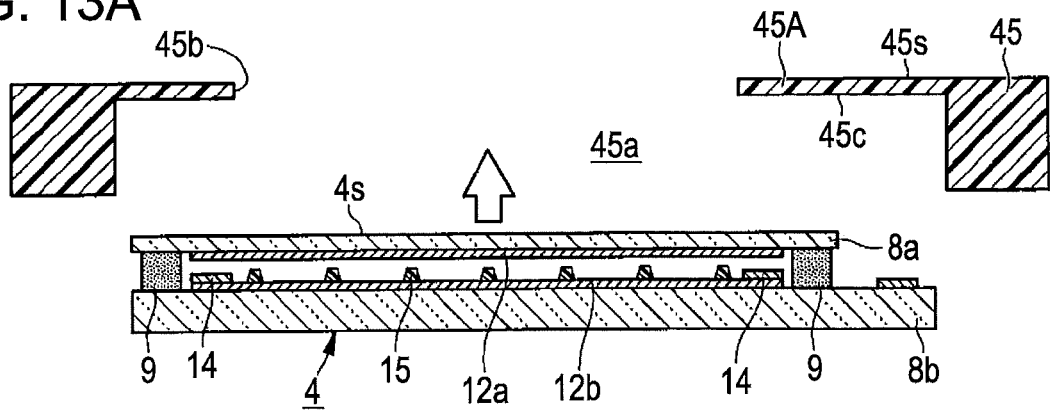
FIGS. 13A to 13D are diagrams showing a manufacturing process of the input device according to the first example of the third embodiment.

First, as shown in FIG. 13A, the cover member 45 having the housing portion 45a and the panel support 45A is prepared. If the cover member 45 is formed of a resin material, the housing portion 45a and the panel support 45A can be easily formed by injection molding. In addition, if the cover member 45 is formed of a metal material, the housing portion 45a and the panel support 45A can be formed by cutting or pressing.

If the cover member 45 is prepared, the touch panel 4, which is separately manufactured, is fitted into the housing portion 45a from an opening end of the housing portion 45a opposite to a side, on which the panel support 45A is formed, in a state where the main surface 4s as the input operation surface turns upward.

As the touch panel 4, one having a known structure may be used, and thus a known manufacturing method may be applied.

Figure 13B:
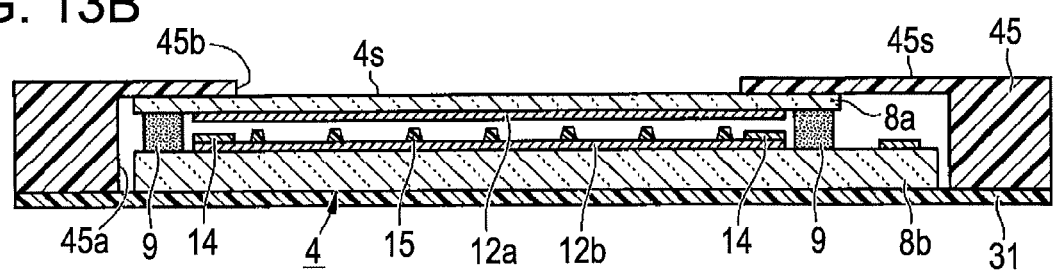

If the touch panel 4 is fitted into the housing portion 45a, as shown in FIG. 13B, since the opening 45b of the panel support 45A is smaller than the main surface 4s of the touch panel 4, the touch panel 4 is housed within the housing portion 45a in a state where the main surface 4s of the touch panel 4 and the rear surface 45c of the panel support 45A. At this time, if an adhesive is provided between the rear surface 45c of the panel support 45A and the main surface 4s of the touch panel 4, the touch panel 4 can be fixed at appropriate strength only by fitting the touch panel 4 into the housing portion 45a.

Next, as shown in FIG. 13B, for example, the rear-side film member 31 formed of a PET film is adhered over the cover member 45 and the rear substrate 8b of the touch panel 4. A silicon-based adhesive may be used in adhering the rear-side film member 31.

Accordingly, the touch panel 4 housed within the housing portion 45a is fixed to the cover member 45 by the rear-side film member 31 that is adhered to the rear side of the touch panel 4 (an opposite side to the panel support 45A).

Figure 13C:
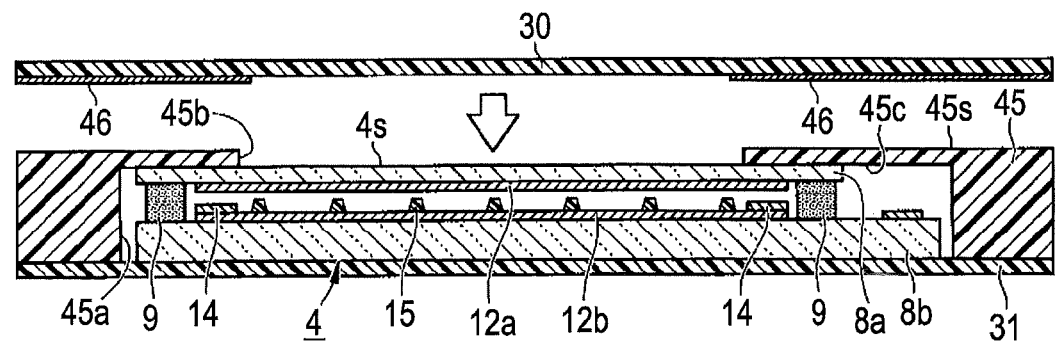
Figure 13D:
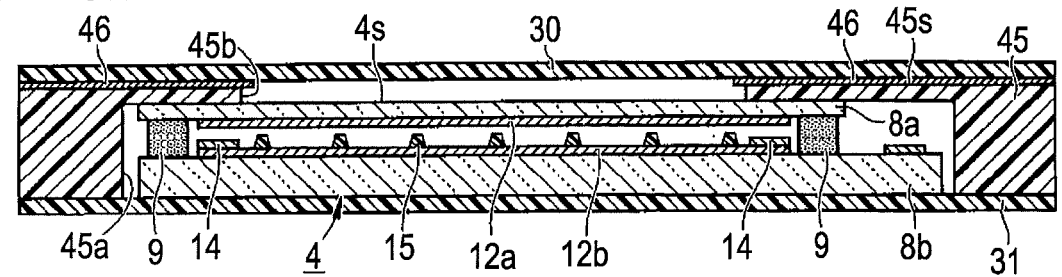

Next, as shown in FIG. 13C, the film member 30 formed of, for example, a PET film is prepared. On a surface of the film member 30 facing the cover member 45, the light-shielding film 46 is printed. Then, as shown in FIG. 13D, the film member 30 is disposed to cover the cover member 45 and the touch panel 4 in a state where the printed surface turns toward the cover member 45. At this time, the opening 46a of the light-shielding film 46 on the surface of the film member 30 is aligned to be disposed within the opening 45b of the panel support 45A.

Figure 14A:
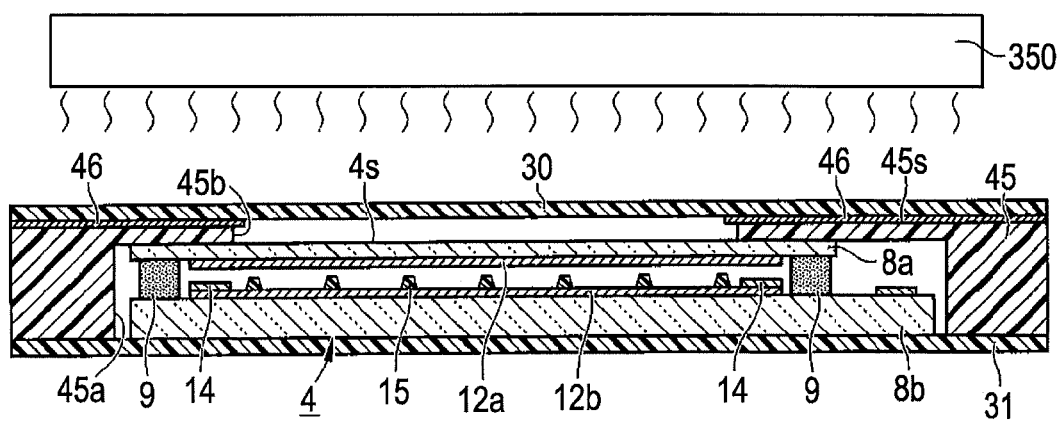
FIGS. 14A and 14B are diagram showing a manufacturing process of the input device according to the first example of the third embodiment.

Next, as shown in FIG. 14A, the film member 30 is heated by a heating device 350 to soften the film member 30, such that the film member 30 is thermally welded to the touch panel 4 and the cover member 45. As the welding method, a welding method, such as thermal welding, vacuum thermal welding, vibration welding, ultrasonic welding, laser welding, impulse welding, high-frequency induction heating, electromagnetic induction heating, or thermal press welding, may be used.

Figure 14B:
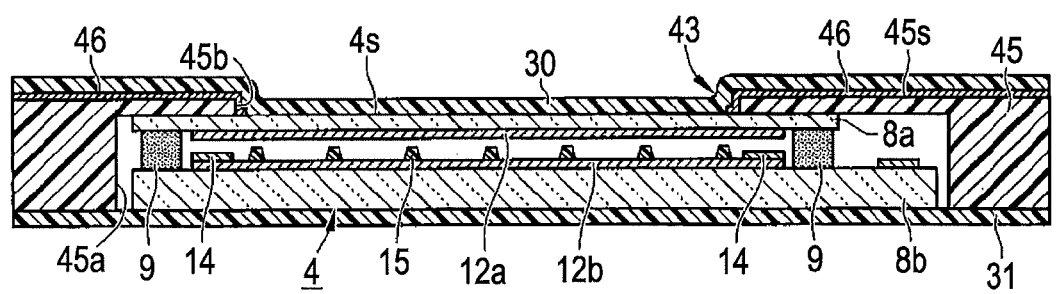

If so, as shown in FIG. 14B, the softened film member 30 is set within the opening 45b of the panel support 45A, and comes into close contact with the touch panel 4 and the cover member 45 to follow the main surface 4s of the touch panel 4 and the step between the touch panel 4 and the cover member 45. In addition, with this step, on the surface of the film member 30, the step portion 43 is formed in a shape that follows the step between the touch panel 4 and the cover member 45.

As described above, according to the manufacturing method of this embodiment, the film member 30 is thermally welded to come into close contact with the touch panel 4 and the step between the touch panel 4 and the cover member 45. Accordingly, the step between the touch panel 4 and the cover member 45 can be lessened by the film member 30. Therefore, the input device 40A having an improved degree of freedom in design can be manufactured with a simple process.

In addition, the touch panel 4 is fitted into the housing portion 45a in the cover member 45, and the rear-side film member 31 is adhered and fixed from the rear side of the touch panel 4. Therefore, the touch panel 4 can be fixed to the cover member 45 with a simple process.

Furthermore, when the light-shielding film 46 is printed on the surface of the film member 30, and accordingly a sufficient adhesive force of the film member 30 when the film member 30 is thermally welded cannot be secured, an adhesive may be disposed on a surface of the film member 30 corresponding to a region, in which the light-shielding film 46 is formed, or the surface of the cover member 45.

Second Example

In the input device 40B of the second example shown in FIG. 10B, an adhesive 42 is filled between the touch panel 4 and the inner wall of the housing portion 45a of the cover member 45 to have a frame shape surrounding the touch panel 4 in plan view. Accordingly, the touch panel 4 is fixed to both the film member 30 and the cover member 45.

According to the input device 40B that is provided with the adhesive 42 between the touch panel 4 and the cover member 45, in addition to the same advantages as the above-described input device 40A, the following advantages can be obtained.

First, since the touch panel 4 is fixed to the cover member 45 by the adhesive 42, the rear-side film member 31 in the first example is not required. For this reason, when a display unit, such as a liquid crystal panel, is provided on the rear side of the touch panel 4 to perform display through the touch panel 4, light loss when light passes through the rear-side film member 31 or reflection at the surface of the rear-side film member 31 does not occur, and thus bright display can be realized so much.

In addition, since the movement of the touch panel 4 in the substrate surface direction or the substrate thickness direction is suppressed, there is no case where the touch panel 4 is pressed down to the rear side due to the input operation on the touch panel 4, or the touch panel 4 moves within the housing portion 45a due to an impact, such as being dropped. Therefore, an input device having excellent operationality and durability can be implemented.

The input device 40B of the second example can be manufactured in the same manner as the input device 40A of the first example, which has been described with reference to FIGS. 13A to 13D and FIGS. 14A and 14B. Meanwhile, in the input device 40B, the rear-side film member 31 is not required. Accordingly, instead of the step of adhering the rear-side film member 31 shown in FIG. 13B, there may be provided a step of disposing the adhesive 42 between the touch panel 4, which is disposed in the housing portion 45a, and the inner wall of the housing portion 45a. In this case, the adhesive 42 may be coated at a predetermined position by a dispenser after the touch panel 4 is housed within the housing portion 45a, or the adhesive 42 may be coated in advance on the side surface of the touch panel 4 that is to be housed within the housing portion 45a. Alternatively, the adhesive 42 may be coated in advance on the inner wall of the housing portion 45a.

Third Example

Figure 15:
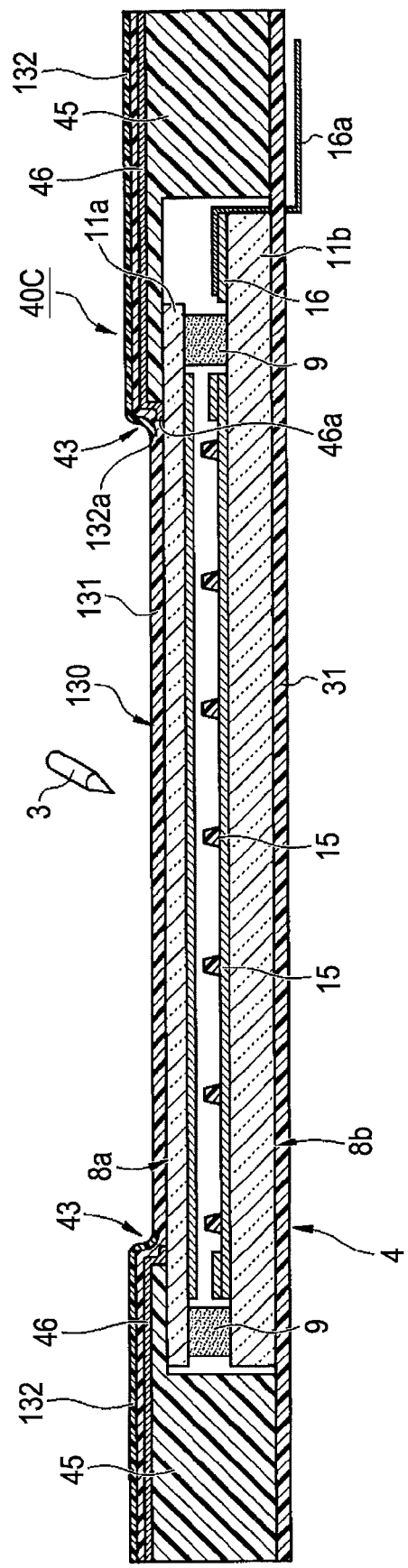
FIG. 15 is a schematic cross-sectional view showing an input device according to a third example of the third embodiment.

FIG. 15 is a schematic cross-sectional view of an input device 40C according to a third example of the third embodiment. FIG. 15 corresponds to FIG. 10A in the first example.

The input device 40C of this example is different from the input device 40B of the second example in that a film member 130, which is formed over the cover member 45 and the touch panel 4, is a laminate of a first resin layer 131 and a second resin layer 132. Accordingly, in FIG. 15, the same parts as those in FIG. 10B are represented by the same reference numerals, and the detailed descriptions thereof will be omitted.

As shown in FIG. 15, the film member 130 includes the planar first resin layer 131 that covers the main surface 45s of the cover member 45 and the main surface 4s of the touch panel 4, which is exposed from the opening 45b of the panel support 45A, and the second resin layer 132 that is formed on a surface of the first resin layer 131 opposite to the cover member 45.

Similarly to the single-layered film member 30 of the first or second example, as the first resin layer 131, a film member formed of a transparent resin material, such as polyethylene (for example, polyethylene terephthalate (PET)), polyester, or polypropylene, may be used.

As shown in FIG. 15, the second resin layer 132 is partially formed on the first resin layer 131. The second resin layer 132 substantially has the same rectangular frame shape as the light-shielding film 46 in plan view and is disposed to overlap the light-shielding film 46 in plan view. The second resin layer 132 has a rectangular opening 132a corresponding to the opening 46a of the light-shielding film 46 in plan view. The opening 132a is formed inside the opening 46a of the light-shielding film 46. Within the opening 132a of the second resin layer 132, an underlying first resin layer 131 is exposed.

The second resin layer 132 is formed of a resin material having a hardness lower than, that is, flexibility higher than that of the resin material for the first resin layer 131. For example, if the first resin layer 131 is formed of a PET film, the second resin layer 132 is formed of polyethylene, urethane, or acryl.

In the input device 40C of this example having the above-described configuration, the film member 130 has a two-layered structure of the first resin layer 131 and the second resin layer 132. In case of the two-layered film member 130, when the film member 130 is thermally welded to the touch panel 4 and the cover member 45, the second resin layer 132 that is formed of a resin material having a hardness lower than that of the first resin layer 131 is softened and widened. Accordingly, the film member 130 is favorably adhered to the step at the boundary of the touch panel 4 and the cover member 45, thereby improving adhesiveness the film member 130, and the touch panel 4 and the cover member 45. Therefore, an input device having excellent reliability and a good design property can be implemented.

In the input device 40C, since the first resin layer 131 having a comparatively high hardness is exposed on the touch panel 4. Accordingly, on a surface on which an input tool 3 or a finger slides during a coordinate input operation on the touch panel 4, abrasion by the operation or damage of the cover member 45 or the surface of the touch panel 4 can be favorably prevented. As the first resin layer 131, a PET film that can favorably prevent the abrasion or damage and obtain good transmittance is preferably used.

In this example, a case where the second resin layer 132 is formed in a substantially rectangular frame shape to substantially overlap the light-shielding film 46 in plan view has been described. Here, the second resin layer 132 is provided to closely adhere the film member 130 along the step at the boundary of the touch panel 4 and the cover member 45. In this example, accordingly, what is necessary to a desired object is that the second resin layer 132 is at least provided at the boundary of the touch panel 4 and the cover member 45.

The second resin layer 132 may be disposed in regions where other steps are formed, in addition to the boundary of the touch panel 4 and the cover member 45. For example, when a protrusion or a concave portion is formed at the main surface 45s of the cover member 45, if the second resin layer 132 is selectively provided at a position that overlaps the protrusion or the concave portion in plan view, the film member 130 can favorably come into close contact with the portion where the protrusion or the concave portion is formed.

Although, in this example, a case where the two-layered film member 130 is adhered has been described, instead of the film member 130, a film member having three resin layers or more may be provided. If the film member that is formed by selectively and planarly arranging a plurality of resin layers having different hardness is used, adhesiveness during welding (following capability to an uneven shape) can be intensively controlled, and the reliability and design property of the input device can be improved.

Instead of the film member 130, a film member, in which resin layers having different hardness are divided within the planar region, may be used. For example, a film member that is formed as a single body by joining a rectangular PET film in plan view corresponding to the main surface 4s of the touch panel 4 and a polyethylene film disposed to surround the PET film in plan view at contact portions thereof may be used.

Method of Manufacturing Input Device of Third Example

Next, the manufacturing method of the input device 40C according to the third example will be described with reference to FIGS. 16A to 16D. FIGS. 16A to 16D are schematic cross-sectional views showing the manufacturing process of the input device 40C. The cross-sectional views of FIGS. 16A to 16D are taken along the line XVI-XVI of FIG. 11.

Figure 16A:
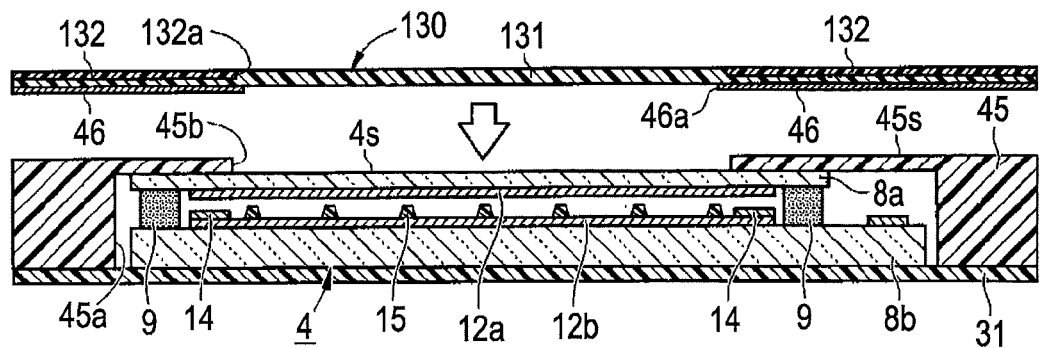
FIGS. 16A to 16D are diagrams showing manufacturing process of the input device according to the third example of the third embodiment.

First, as shown in FIG. 16A, the cover member 45 that has the housing portion 45a and the panel support 45A is prepared, and the touch panel 4, which is separately manufactured, is fitted into the housing portion 45a from an opening end of the housing portion 45a opposite to a side, on which the panel support 45A is formed, in a state where the main surface 4s as the input coordinate surface turns upward. Thereafter, the rear-side film member 31 formed of, for example, a PET film is adhered over the cover member 45 and the rear substrate 8b of the touch panel 4.

In addition, as shown in FIG. 16A, the film member 130 that is formed by laminating the first resin layer 131 formed of a PET film and the second resin layer 132 formed of a polyethylene film is prepared. On the surface of the film member 130 facing the cover member 45, the light-shielding film 46 is printed.

Figure 16B:
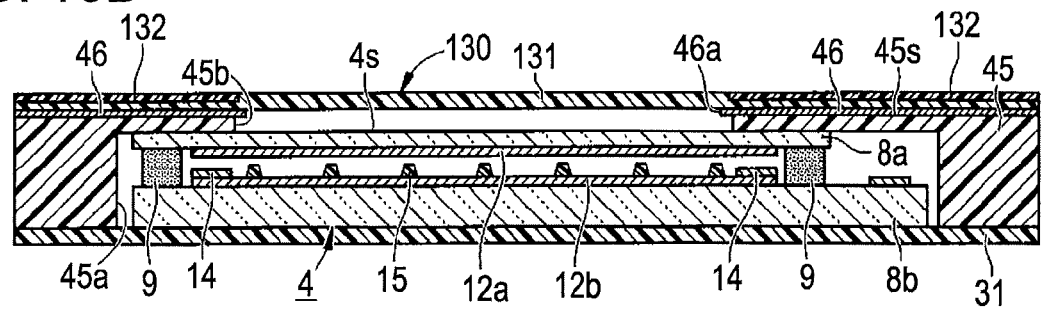

Next, as shown in FIG. 16B, the film member 130 is disposed to cover the cover member 45 and the touch panel 4 in a state where the printed surface turns toward the cover member 45. At this time, the opening 46a of the light-shielding film 46 on the surface of the film member 130 is aligned to be disposed within the opening 45b of the panel support 45A.

Figure 16C:
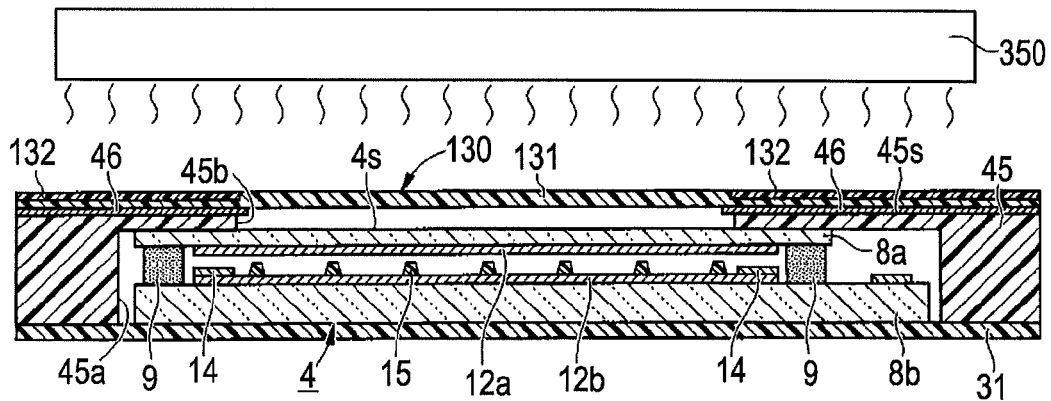

Next, as shown in FIG. 16C, the film member 130 is heated by the heating device 350 to soften the film member 130, such that the film member 130 is thermally welded to the touch panel 4 and the cover member 45. As the welding method, a welding method, such as thermal welding, vacuum thermal welding, vibration welding, ultrasonic welding, laser welding, impulse welding, high-frequency induction heating, electromagnetic induction heating, or thermal press welding, may be used.

Figure 16D:
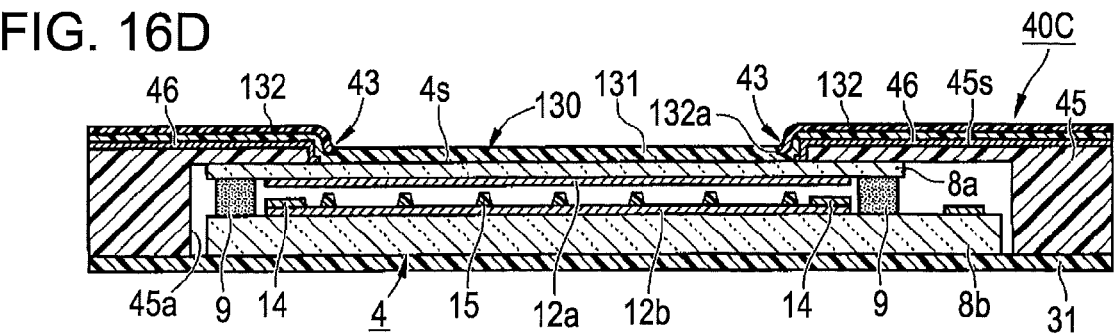

If so, as shown in FIG. 16D, the softened film member 130 is set within the opening 45b of the panel support 45A, and comes into close contact with the touch panel 4 and the cover member 45 to follow the main surface 4s of the touch panel 4 and the step between the touch panel 4 and the cover member 45. In addition, with this step, on the surface of the film member 130, the step portion 43 is formed in a shape that follows the step between the touch panel 4 and the cover member 45.

In this embodiment, the second resin layer 132 formed of a resin material having a low hardness is formed on the first resin layer 131 of the film member 130. Accordingly, when heating is performed by the heating device 350, the second resin layer 132 having comparably high flexibility is widened on the first resin layer 131. Therefore, the film member 130 smoothly comes into close contact with the step between the touch panel 4 and the cover member 45.

As described above, according to the manufacturing method of this embodiment, the two-layered film member 130 is thermally welded to come into close contact with the touch panel 4 and the step between the touch panel 4 and the cover member 45. Accordingly, the film member 130 can smoothly come into close contact with the step between the touch panel 4 and the cover member 45. Therefore, the input device 40C, in which the step is effectively lessened and the degree of freedom in design is improved, can be manufactured with a simple process.

The touch panel 4 is fitted into the housing portion 45a in the cover member 45, and the rear-side film member 31 is adhered and fixed from the rear side of the touch panel 4. Therefore, the touch panel 4 can be fixed to the cover member 45 with a simple process.

Fourth and Fifth Examples

Figure 17A:
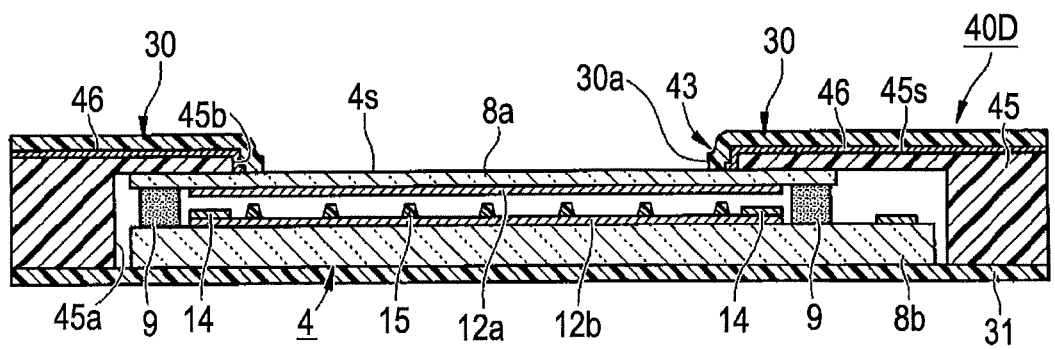
FIGS. 17A and 17B are diagrams showing manufacturing processes of input devices according to fourth and fifth examples of the third embodiment, respectively.
Figure 17B:
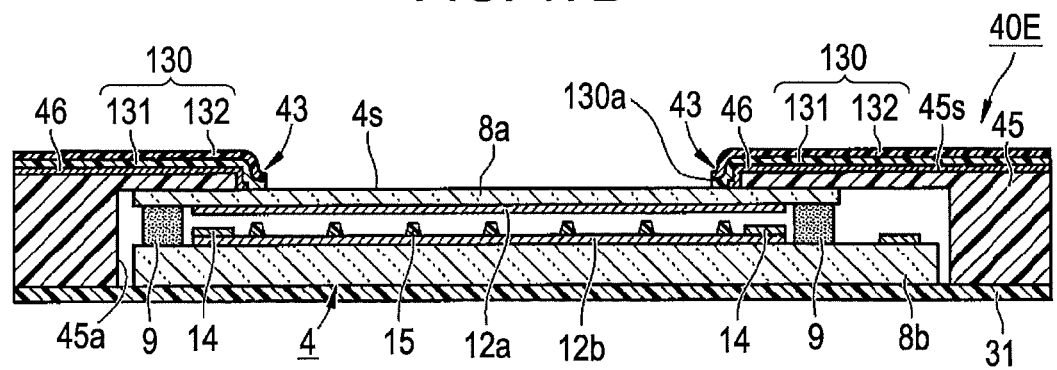

FIG. 17A is a schematic cross-sectional view of an input device 40D according to a fourth example of the third embodiment. FIG. 17B is a schematic cross-sectional view of an input device 40E according to a fifth example of the third embodiment. FIGS. 17A and 17B correspond to FIG. 10A in the first example.

The input device 40D of the fourth example has the same basic configuration as the input device 40A of the first example, except that an opening 30a is formed in the film member 30, which is formed over the cover member 45 and the touch panel 4.

The input device 40E of the fifth example has the same basic configuration of the input device 40C of the third example, except that an opening 130a is formed in the film member 130, which is formed over the cover member 45 and the touch panel 4.

Therefore, in FIGS. 17A and 17B, the same parts as those in FIGS. 10A, 10B, and 15 are represented by the same reference numerals, and the detailed descriptions thereof will be omitted.

As shown in FIG. 17A, in the input device 40D of the fourth example, the opening 30a of the film member 30 is formed in a rectangular shape along an edge of the opening 46a of the light-shielding film 46 that is formed to overlap the marginal portion of the touch panel 4. The opening 30a is formed to correspond to the planar region that becomes an input operation portion of the touch panel 4.

As shown in FIG. 17B, in the input device 40E of the fifth example, the opening 130a of the film member 130 is also formed in a rectangular shape along an edge of the opening 46a of the light-shielding film 46 that is formed to overlap the marginal portion of the touch panel 4. The opening 130a is formed to correspond to the planar region that becomes the input operation portion of the touch panel 4.

Therefore, in the input device 40D or 40E, the input operation on the touch panel 4 is performed by directly sliding the input tool 3 or the finger on the front substrate 8a.

In the input devices 40D and 40E of the fourth and fifth examples having the above-described configurations, the input operation on the touch panel 4 is performed by directly pressing the front substrate 8a. Accordingly, an operation pressure can be reduced, which enables a comfort input operation, compared with the input device 40A of the first example, in which the input operation is performed through the film member 30, and the input device 40C of the third example, in which the input operation is performed through the film member 130.

In the fourth and fifth examples, the film member 30 and the film member 130 are partially removed to form the openings 30a and 130a, respectively. Accordingly, a region where the film member 30 or the film member 130 and the touch panel 4 are adhered to each other is only defined in the marginal region of the touch panel 4 (front substrate 8a). The width of the marginal region depends on the size of the touch panel 4, but since the width of at least several mm can be secured, sufficient adhesion strength of the film member 30 or the film member 130, and the touch panel 4 can be secured.

However, as compared with the input devices 40A and 40C of the foregoing examples, the adhesion area is narrow, and adhesion strength is lowered. Accordingly, in the input devices 40D and 40E of the fourth and fifth examples, like the input device 40B of the second example, an adhesive 42 is preferably disposed in a space between the touch panel 4 and the cover member 45 to adhere the cover member 45 and the touch panel 4 to each other.

In the fourth and fifth examples, as shown in FIGS. 17A and 17B, preferably, the light-shielding film 46 of the film member 30 or the film member 130 formed on the cover member 45 side is formed outside the opening 30a of the film member 30 or the opening 130a of the film member 130, such that the edge of the light-shielding film 46 is exposed within the opening 30a or 130a. With this configuration, separation at an interface of the light-shielding film 46 and the film member 30 or 130 can be prevented from occurring, thereby effectively protecting the light-shielding film 46.

In the fourth and fifth examples, the front substrate 8a of the touch panel 4 is exposed. Accordingly, if the substrate main body 11a of the front substrate 8a is formed of a glass substrate, when the glass substrate is broken due to an impact, such as being dropped, the pieces may shatter. Therefore, when the configuration of this example is used, a high-strength glass substrate or a plastic substrate is preferably used for the substrate main body 11a of the front substrate 8a. Alternatively, transparent resin may be coated on the surface of the substrate main body 11a to form a protective layer.

Fourth Embodiment

Next, an electro-optical device according to a fourth embodiment of the invention will be described with reference to FIG. 18.

Figure 18:
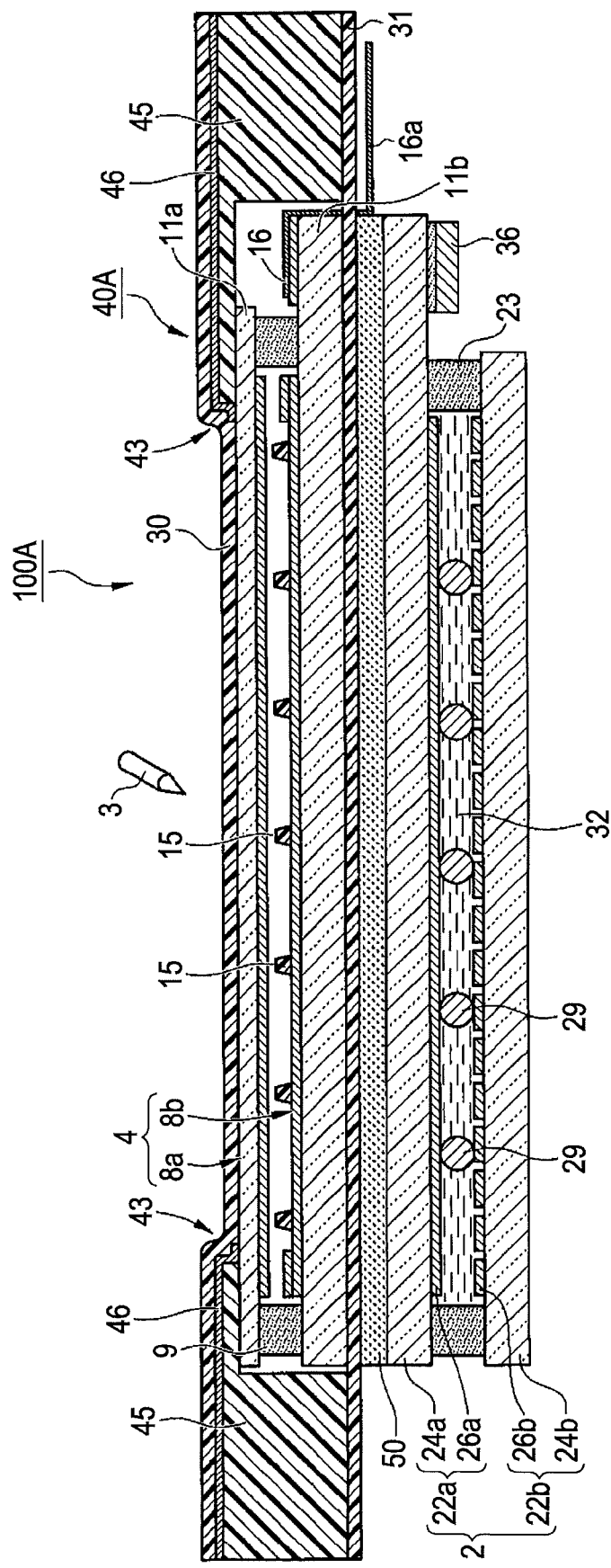
FIG. 18 is a schematic cross-sectional view showing a liquid crystal device according to a fourth embodiment of the invention.

FIG. 18 is a schematic cross-sectional view showing a touch panel-integrated liquid crystal device that is an example of an electro-optical device according to a fourth embodiment of the invention.

A liquid crystal device 100A shown in FIG. 18 includes a liquid crystal panel (electro-optical panel) 2 that serves a display unit, and the input device 40A of the third embodiment that is provided the front side of the liquid crystal panel 2 (an upper side in FIG. 18; an observation side).

As described above, the input device 40A includes the analog resistive film-type touch panel (input panel) 4, the cover member 45 that is provided with the housing portion 45a, in which the touch panel 4 is housed, the film member 30 that is adhered to the main surface 45s of the cover member 45 and the main surface 4s of the touch panel 4 to cover the touch panel 4 and the cover member 45, and the rear-side film member 31 that is adhered on the rear side of the touch panel 4.

The liquid crystal panel 2 is optically adhered to the rear-side film member 31, which is adhered on the rear side of the touch panel 4, by an adhesive 50 containing a translucent elastomer (for example, a translucent elastomer, such as silicon gel, acrylic gel, urethane gel, or urethane rubber, which has a difference in the refractive index from glass). If the adhesive 50 is formed of an elastomer, a pressing force when an input operation is performed on the touch panel 4 is absorbed by the elastomer. Therefore, it is possible to suppress display irregularity when the substrate of the liquid crystal panel 2 is distorted by the input operation.

The configurations of the liquid crystal panel 2, the polarizing plates, and the illumination device (backlight) are as described in the second embodiment.

According to the liquid crystal device 100A of this example having the above-described configuration, the input device 40A of the third embodiment, and the liquid crystal panel 2 that is adhered to the rear-side film member 31 of the input device 40A are provided. Therefore, display through the touch panel 4 can be performed.

In the liquid crystal device of this embodiment, with the film member 30 that is adhered to the display surface, the step between the touch panel 4 and the cover member 45 has a smoothly continuous shape. In addition, printing can be appropriately performed on the film member 30. Therefore, a liquid crystal device that has a high degree of freedom in design and an excellent design property is obtained.

In the liquid crystal device of this embodiment, the film member 30 is provided on the front side of the touch panel 4. Accordingly, the touch panel 4 that uses a glass substrate for the front substrate 8a can be safely used. In case of a touch panel that uses a glass substrate for the two substrate main bodies 11a and 11b, high transmittance is obtained, compared with a case where the substrate main body 11a is a plastic substrate or the substrate main bodies 11a and 11b are plastic substrates. Accordingly, bright and high-quality display can be realized, compared with the related art.

Although, in this embodiment, the liquid crystal device, in which the liquid crystal panel 2 and the input device 40A are arranged, has been described, the liquid crystal panel 2 and any one of the input devices 40B to 40E may be arranged therein. In addition, instead of the liquid crystal panel 2, other display units, such as an organic EL panel and the like, may be disposed.

Electronic Apparatus

Next, an electronic apparatus according to the invention will be described with reference to FIGS. 19A and 19B, 20A and 20B, and 21.

Figure 19A:
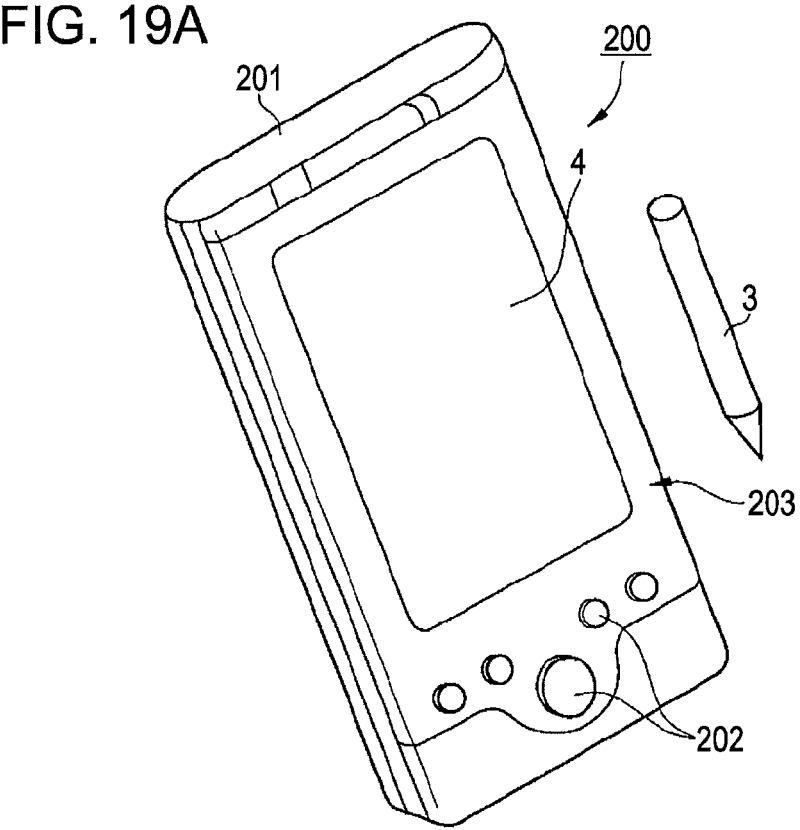
FIGS. 19A and 19B are perspective views showing an example of an electronic apparatus according to the invention.
Figure 19B:
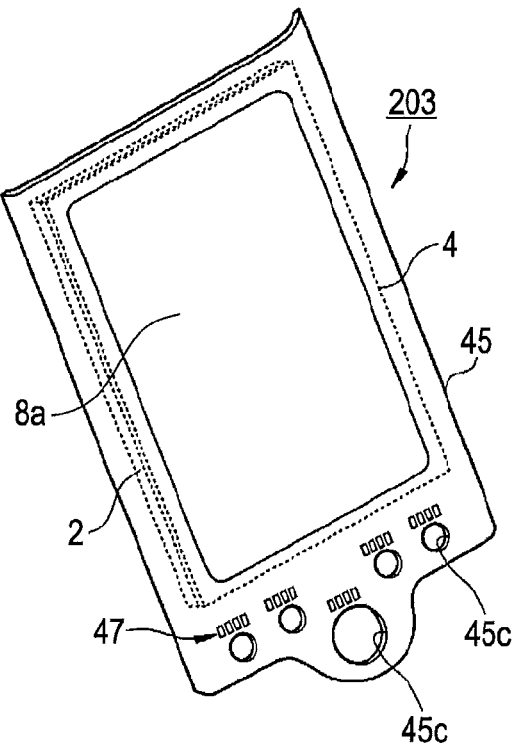
Figure 20A:
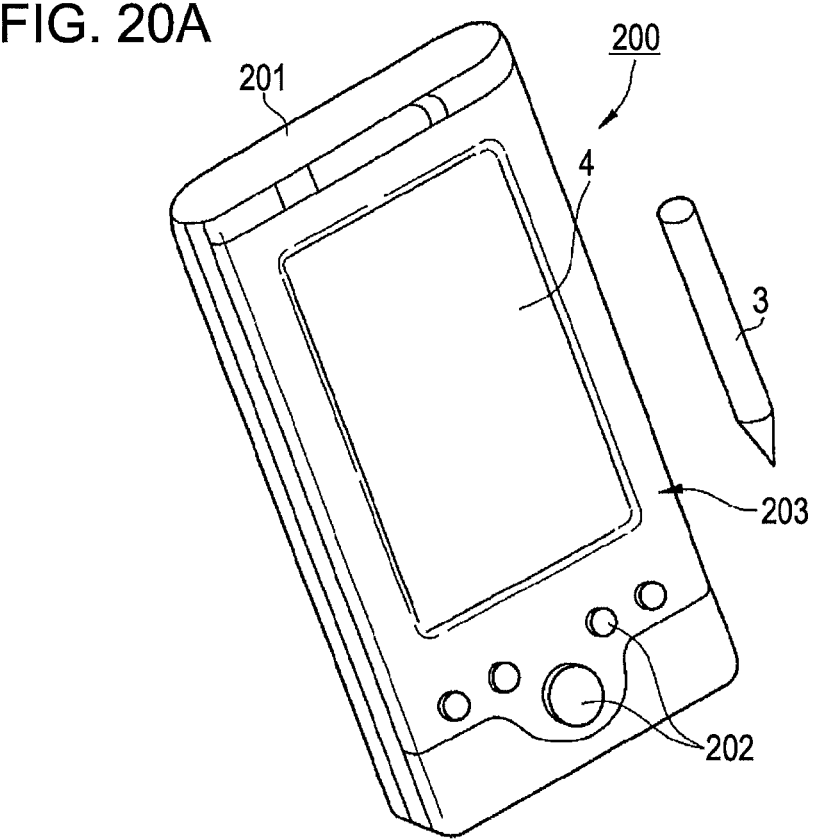
FIGS. 20A and 20B are perspective views showing another example of an electronic apparatus according to the invention.
Figure 20B:
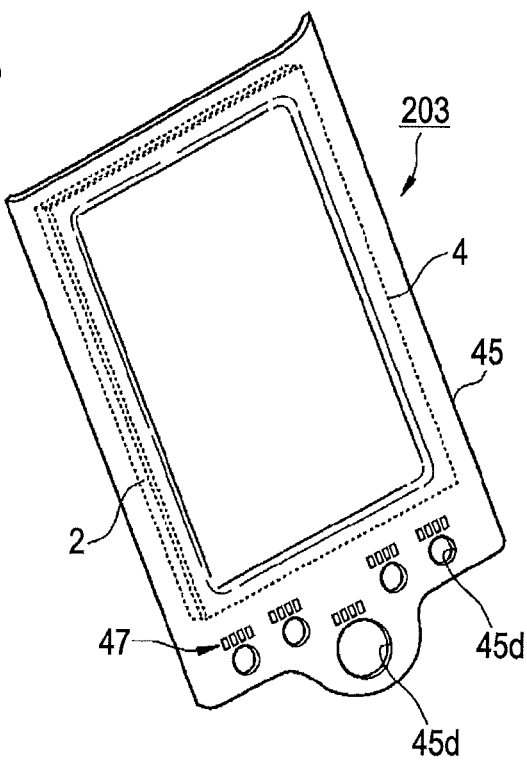

FIGS. 19A and 20A are schematic cross-sectional views of a PDA (Personal Digital Assistant) 200 that includes the liquid crystal device according to one of the above-described embodiments. FIGS. 19B and 20B are perspective views of a liquid crystal device that is provided in the PDA 200.

As shown in FIGS. 19A and 20A, the PDA 200 includes, in a casing 201, function keys 202 that constitute an operation unit, and a touch panel-integrated display 203. The touch panel-integrated display 203 is composed of the liquid crystal device according to the invention. As shown in FIGS. 19B and 20B, the touch panel-integrated display 203 includes a cover member 45 that is processed in a predetermined shape to constitute a display unit and an operation unit of the PDA 200, a touch panel 4 that is supported by the cover member 45, and a liquid crystal panel 2 that is provided on the rear side of the touch panel 4. In addition, films (30) (not shown) are adhered to the surfaces of the touch panel 4 and the cover member 45 to protect the input operation surface of the touch panel 4 and the surface of the cover member 45.

The cover member 45 is provided with a plurality of through-holes 45c, and the function keys 202 are inserted into the through-holes 45c to be exposed from the surface. In addition, identification information (characters or figures) are printed on the rear side of the film (the cover member 45 side), which cover the cover member 45, around the through-holes 45c.

In the PDA 200 of this embodiment, a user performs an operation, such as data input, by directly indicating a position on the touch panel while viewing the identification information printed around the function keys 202 or screen display of the liquid crystal panel 2 disposed below the touch panel 4.

Figure 21:
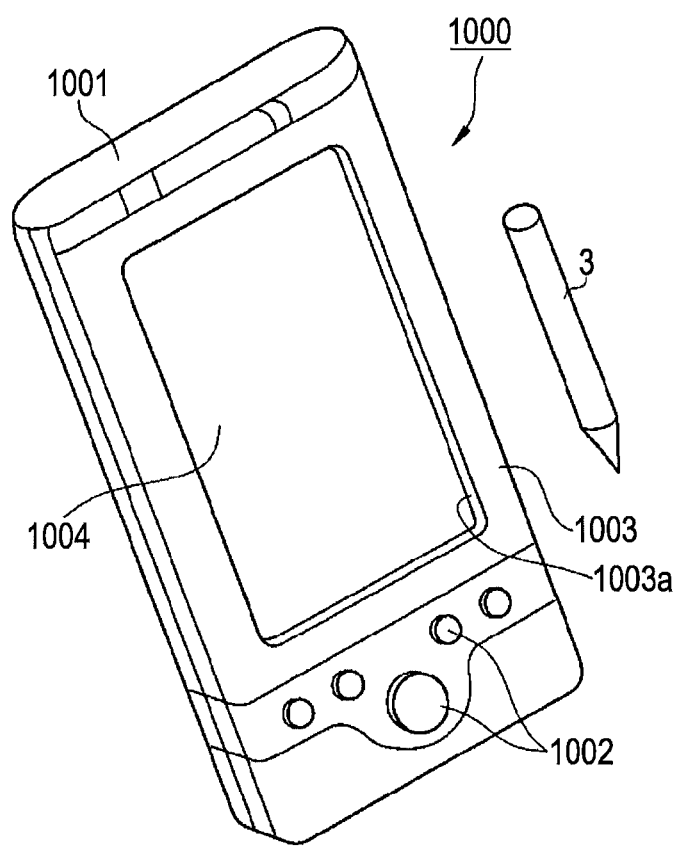
FIG. 21 is a perspective view showing a known touch panel-equipped PDA.

Here, FIG. 21 shows a known PDA for comparison. A PDA 1000 shown in FIG. 21 includes a casing 1001, function keys 1002, and a touch panel 1004 that is disposed in an opening of the casing 1001. Disposed below the touch panel 1004 is a liquid crystal panel (not shown).

As shown in FIG. 21, in the related art, the touch panel 1004 is pressed and supported by a frame portion 1003 of the casing 1001. Accordingly, a step portion 1003a is formed between the operating surface of the touch panel 1004 and the frame portion 1003. Due to the step portion 1003a, the operating surface of the touch panel 1004 and the frame portion 1003 therearound are clearly divided, which limits design of the casing 1001.

In contrast, according to the PDA 200 of this embodiment having the above-described configuration, since the liquid crystal device according to the embodiment of the invention that serves as the input device and the display device is provided, no step is formed between the touch panel 4 and the cover member 45 therearound. In addition, with the film member, a step has a smoothly continuous shape, and thus a PDA having an excellent design property can be implemented. Furthermore, design of the entire casing including the touch panel 4 can be realized, and thus an electronic apparatus having an excellent design property can be implemented. Furthermore, an electronic apparatus that can perform bright display and has excellent operationality and high reliability can be implemented.

Moreover, the input device or the liquid crystal device (electro-optical device) may be mounted on various electronic apparatuses, in addition to the above-described PDA. As the electronic apparatus, for example, a cellular phone, an electronic book, a personal computer, a digital still camera, a liquid crystal television, a view-finder-type or monitor-direct-view-type video tape recorder, a car navigation device, a pager, an electronic organizer, an electronic calculator, a word processor, a workstation, a video phone, a POS terminal, and a printing apparatus can be exemplified. The input device can be appropriately used as an input unit for the above-described electronic apparatuses, and the liquid crystal device can be appropriately used as an image display unit and an input unit for the above-described electronic apparatuses.

What is claimed is:

1. An input device comprising:
an input panel;
a cover member that is provided with a housing portion, in which the input panel is housed; and
a film member that is disposed over a main surface of the cover member and a main surface of the input panel housed in the housing portion,
wherein the cover member is apart from the main surface of the input panel,
wherein the main surface of the cover member is substantially the same in a position as the main surface of the input panel in a direction perpendicular to the main surface of the cover member,
wherein an upper surface of the film member is at least substantially planar as it extends across both the main surface of the input panel and the main surface of the cover member such there is no step formed therebetween,
wherein an outer surface of the film member has a planar surface across both the cover member and the input panel in plan view, and
wherein the main surface of the input panel and the main surface of the cover member are adhered to the film member.

2. The input device according to claim 1, wherein a second film member is adhered on a side of the input panel opposite to the film member.

3. The input device according to claim 1, wherein a light-shielding film is formed between the film member and the cover member, and is formed to cover at least a portion of the main surface of the input panel.

4. The input device according to claim 1, wherein the film member and the input panel are optically adhered to each other.

5. The input device according to claim 1, wherein the film member has an opening within a planar region of the input panel.

6. The input device according to claim 1, wherein an adhesive is provided between the input panel and an inner wall of the housing portion.

7. The input device according to claim 1, wherein the film member that is adhered to the main surface of the input panel is a polarizing plate.

8. The input device according to claim 1, wherein the film member is a laminate of a first resin layer and a second resin layer that is formed of a resin material having a hardness lower than that of the first resin layer.

9. The input device according to claim 8, wherein the second resin layer has an opening within a planar region of the input panel.

10. The input device according to claim 8, wherein a panel support is formed to protrude in a frame shape within the housing portion of the cover member to be in contact with the input panel and support the input panel.

11. An electro-optical device comprising:
an input device, the input device including
an input panel,
a cover member that is provided with a housing portion, in which the input panel is housed, and
a film member that is disposed over a main surface of the cover member and a main surface of the input panel housed in the housing portion; and
an electro-optical panel that is provided on a side of the input device opposite to the film member,
wherein the cover member is apart from the main surface of the input panel,
wherein the main surface of the cover member is substantially the same in a position as the main surface of the input panel in a direction perpendicular to the main surface of the cover member,
wherein an upper surface of the film member is at least substantially planar as it extends across both the main surface of the input panel and the main surface of the cover member such there is no step formed therebetween,
wherein an outer surface of the film member has a planar surface across both the cover member and the input panel in plan view, and
wherein the electro-optical panel is fixed to the cover member, and the input panel is clamped between the electro-optical panel and the film member.

12. The electro-optical device according to claim 11, wherein the film member is adhered to the main surface of the input panel and the main surface of the cover member.

13. The electro-optical device according to claim 11, wherein a substrate constituting the electro-optical panel and a surface of the input device opposite to the film member are optically adhered to each other.

14. The electro-optical device according to claim 11, wherein the film member is a polarizing plate.

15. The electro-optical device according to claim 11, wherein a translucent elastic member is disposed between a substrate constituting the electro-optical panel and a surface of the input device opposite to the film member.

16. An electronic apparatus comprising:
an electro-optical device; and
a case member that accommodates the electro-optical device;
wherein the electro-optical device includes an input device and an electro-optical panel that is provided on a side of the input device opposite to the film member,
wherein the input device includes:
an input panel,
a cover member that is provided with a housing portion, in which the input panel is housed, and
a film member that is disposed over a main surface of the cover member and a main surface of the input panel housed in the housing portion,
wherein the cover member is apart from the main surface of the input panel,
wherein the main surface of the cover member is substantially the same in a position as the main surface of the input panel in a direction perpendicular to the main surface of the cover member,
wherein an upper surface of the film member is at least substantially planar as it extends across both the main surface of the input panel and the main surface of the cover member such there is no step formed therebetween,
wherein an outer surface of the film member has a planar surface across both the cover member and the input panel in plan view,
wherein the film member is a polarizing plate, and
wherein the cover member is composing a part of case member of the electronic apparatus.

* * * * *